(12) United States Patent
Kalra et al.

(10) Patent No.: US 9,188,285 B2
(45) Date of Patent: Nov. 17, 2015

(54) SYSTEMS AND METHODS FOR OXIDATION OF BOIL-OFF GAS

(71) Applicant: General Electric Company, Schenectady, NY (US)

(72) Inventors: Chiranjeev Kalra, Niskayuna, NY (US); William Dwight Gerstler, Niskayuna, NY (US); Laura Michele Hudy, Waterford, NY (US); Michael Jay Epstein, Cincinnati, OH (US); Vaibhav Bahadur, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 406 days.

(21) Appl. No.: 13/726,480

(22) Filed: Dec. 24, 2012

(65) Prior Publication Data

US 2014/0174103 A1 Jun. 26, 2014

(51) Int. Cl.
*F23C 13/00* (2006.01)
*F17C 5/02* (2006.01)
(Continued)

(52) U.S. Cl.
CPC . *F17C 5/02* (2013.01); *F23G 7/066* (2013.01); *F23G 7/07* (2013.01); *F23J 15/06* (2013.01); *B64D 37/30* (2013.01); *B64D 37/32* (2013.01); *F23G 2206/10* (2013.01); *F23M 2900/13003* (2013.01); *Y02E 20/12* (2013.01); *Y02E 20/363* (2013.01)

(58) Field of Classification Search
CPC .................. F17C 2223/0161; F02M 21/0221; F23C 13/00; F23C 2203/10; F23N 2037/12; F23R 3/40; F25J 2210/62

USPC ................................ 431/268, 7; 60/723, 777
See application file for complete search history.

(56) References Cited

U.S. PATENT DOCUMENTS 5,431,017 A * 7/1995 Kobayashi et al. ............. 60/723
6,065,957 A * 5/2000 Kondo et al. .................. 431/116
(Continued)

FOREIGN PATENT DOCUMENTS

CA        2450485 A1    5/2005
DE   202005009890 U1    9/2005
(Continued)

OTHER PUBLICATIONS

International Search Report and Written Opinion from PCT Application No. PCT/US2013/074994 dated Jun. 5, 2014.
(Continued)

*Primary Examiner* — Jorge Pereiro
(74) *Attorney, Agent, or Firm* — John P. Darling

(57) ABSTRACT

A system in one embodiment includes a mixing module, an oxidation module, and a heat exchanger. The mixing module is configured to receive and mix a boil-off gas stream from a cryotank. The oxidation module is configured to receive the mixed stream, and to oxidize the boil-off gas in the mixed stream to produce an exhaust stream. The heat exchanger is configured to exchange heat between streams passing through a first passage configured to receive at least a portion of the exhaust stream, and a second passage configured to receive a fluid including the boil-off gas. The heat exchanger is configured to heat the fluid including the boil-off gas and cool the at least a portion of the exhaust stream. The fluid including the boil-off gas is heated by the heat exchanger upstream of the oxidation module.

19 Claims, 5 Drawing Sheets

(51) Int. Cl.
*F23J 15/06* (2006.01)
*F23G 7/06* (2006.01)
*F23G 7/07* (2006.01)
*B64D 37/30* (2006.01)
*B64D 37/32* (2006.01)

(56) References Cited

U.S. PATENT DOCUMENTS

| | | | |
|---|---|---|---|
| 6,107,693 A * | 8/2000 | Mongia et al. | 290/52 |
| 6,313,544 B1 * | 11/2001 | Mongia et al. | 290/52 |
| 6,986,247 B1 * | 1/2006 | Parise | 60/284 |
| 7,007,487 B2 * | 3/2006 | Belokon et al. | 60/777 |
| 7,008,219 B2 | 3/2006 | Shimada et al. | |
| 7,131,265 B2 | 11/2006 | Lechner | |
| 7,493,766 B2 * | 2/2009 | Yang et al. | 60/722 |
| 7,641,888 B2 | 1/2010 | Gobina et al. | |
| 8,820,085 B2 * | 9/2014 | Kajita | 60/723 |
| 8,980,193 B2 * | 3/2015 | Denison et al. | 422/198 |
| 2003/0031970 A1 | 2/2003 | Shimada et al. | |
| 2004/0081871 A1 * | 4/2004 | Kearl et al. | 429/26 |
| 2006/0218900 A1 * | 10/2006 | Lechner | 60/286 |
| 2007/0199941 A1 | 8/2007 | Reese | |
| 2008/0308175 A1 | 12/2008 | Lee et al. | |
| 2009/0050189 A1 * | 2/2009 | Richter et al. | 136/201 |
| 2011/0067401 A1 * | 3/2011 | Kajita | 60/723 |
| 2011/0127373 A1 | 6/2011 | Thomas et al. | |
| 2012/0108117 A1 | 5/2012 | Kwon et al. | |
| 2013/0104525 A1 * | 5/2013 | Allam et al. | 60/273 |

FOREIGN PATENT DOCUMENTS

| | | | |
|---|---|---|---|
| DE | 102004039840 A1 | | 2/2006 |
| DE | 102004045267 | * | 3/2006 |
| EP | 0745499 B1 | | 12/1996 |
| JP | 2007333014 A | | 12/2007 |
| WO | 2012045035 A2 | | 4/2012 |

OTHER PUBLICATIONS

Hoflund et al., "Catalytic Methane Oxidation Over Pd Supported on Nanocrystalline and Polycrystalline TiO2 Mn3O4, CeO2 and ZrO2", Reaction Kinetics and Catalysis Letters, vol. 70, Issue 1, pp. 97-103, May 2000.

Liu et al., "Thermodynamic-Analysis-Based Design and Operation for Boil-Off Gas Flare Minimization at LNG Receiving Terminals", Ind. Eng. Chem. Res., vol. 49, Issue 16, pp. 7412-7420, 2010.

Corzo ., "Sustainable Reduction of CO2 Emissions and Pollutants using LNG for the Danube Inland Navigation", Masther Thesis—Vienna University of Technology, Apr. 2011, Location: Vienna.

Mills et al., "Design, Fabrication and Testing of a Liquid Hydrogen Fuel Tank for a Long Duration Aircraft", AIP Conference Proceedings—Cryogenic Fuels and Storage, vol. 1434, pp. 773-780, Jun. 13-17, 2011.

* cited by examiner

SYSTEMS AND METHODS FOR OXIDATION OF BOIL-OFF GAS

BACKGROUND

Cryogenic fluids may be used on-board aircraft, trains, ships, motor vehicles, or other applications that limit the size or weight of a system utilizing cryogenic fluids. For example, some aircraft engines are configured to use natural gas as fuel. The natural gas may be stored on-board the aircraft as liquid natural gas (LNG), which is a cryogenic fluid. Cryogenic fluids may be stored on-board aircraft within a cryogenic tank that holds a volume of the cryogenic fluid. After a cryogenic tank is filled with LNG, the tank may be exposed to higher temperatures. As ambient temperature increases, LNG within the tank may evaporate as a boil-off gas, creating increasing pressure within the cryogenic tank.

Thus, to combat the increasing pressure within the cryogenic tank, the boil-off gas may be released from the tank, for example, through a valve. In some systems, the boil-off gas may be vented directly to the atmosphere. However, venting the boil-off gas to the atmosphere has drawbacks and undesirable effects.

BRIEF DESCRIPTION

In one embodiment, a system is provided including a mixing module, an oxidation module, and a heat exchanger. The mixing module is configured to receive and mix a boil-off gas stream including a boil-off gas from a cryotank disposed in an upstream direction from the mixing module and an oxygen stream to form a mixed stream. The oxidation module is disposed in a downstream direction of the mixing module and is configured to receive the mixed stream. The oxidation module includes a catalytic converter configured to oxidize the boil-off gas in the mixed stream to produce an exhaust stream that is output in the downstream direction. The heat exchanger includes a first passage and a second passage. The heat exchanger is configured to exchange heat between streams passing through the first and second passages. The first passage is configured to receive at least a portion of the exhaust stream, and the second passage is configured to receive a fluid including the boil-off gas. The second passage includes an inlet and an outlet, and the inlet and the outlet of the second passage are disposed upstream of the oxidation module, whereby the heat exchanger is configured to heat the fluid including the boil-off gas and cool the at least a portion of the exhaust stream. The fluid including the boil-off gas is heated by the heat exchanger upstream of the oxidation module.

In another embodiment, a system includes a cryotank, a control valve, a mixing module, an oxidation module, and an energy generation module. The cryotank is configured to contain a cryogenic fluid. The control valve is operably connected to the cryotank, and configured to release a boil-off gas stream from the cryotank. The boil-off gas stream includes a boil-off gas. The mixing module is disposed downstream of the cryotank and is configured to receive and mix the boil-off gas stream and an oxygen stream to form a mixed stream. The oxidation module is disposed downstream of the mixing module and configured to receive the mixed stream. The oxidation module includes a catalytic converter configured to oxidize the boil-off gas in the mixed stream to produce an exhaust stream that is output downstream. The energy generation module is disposed downstream of the oxidation module and is configured to use the exhaust stream to provide energy for operating at least a portion of the system.

In another embodiment, a tangible and non-transitory computer readable medium is provided. The tangible and non-transitory computer readable medium includes one or more computer software modules configured to direct at least one processor to direct a boil-off gas stream comprising boil-off gas from a cryotank to a mixing module. The tangible and non-transitory computer readable medium also includes one or more computer software modules configured to direct at least one processor to direct an oxygen stream to the mixing module. Further, the tangible and non-transitory computer readable medium includes one or more computer software modules configured to direct at least one processor to mix the boil-off gas stream and the oxygen stream in the mixing module to produce a mixed stream, and to direct the mixed stream through an oxidation module comprising a catalytic converter, whereby an exhaust stream is produced by the catalytic converter. The tangible and non-transitory computer readable medium also includes one or more computer software modules configured to direct at least one processor to direct the exhaust stream through at least one of a heat exchanger or an energy generation module. The heat exchanger includes a first passage and a second passage, and is configured to exchange heat between streams passing through the first and second passages. The first passage is configured to receive the exhaust stream, and the second passage is configured to receive a fluid including the boil-off gas. The second passage includes an inlet and an outlet, whereby the inlet and the outlet of the second passage are disposed upstream of the oxidation module, whereby the heat exchanger is configured to heat the fluid including the boil-off gas and cool the exhaust stream, whereby the fluid including the boil-off gas is heated by the heat exchanger upstream of the oxidation module. The energy generation module is disposed downstream of the oxidation module and is configured to use the exhaust stream to provide energy for operating at least a portion of a system configured to process the boil-off gas stream.

DETAILED DESCRIPTION

Figure 1:
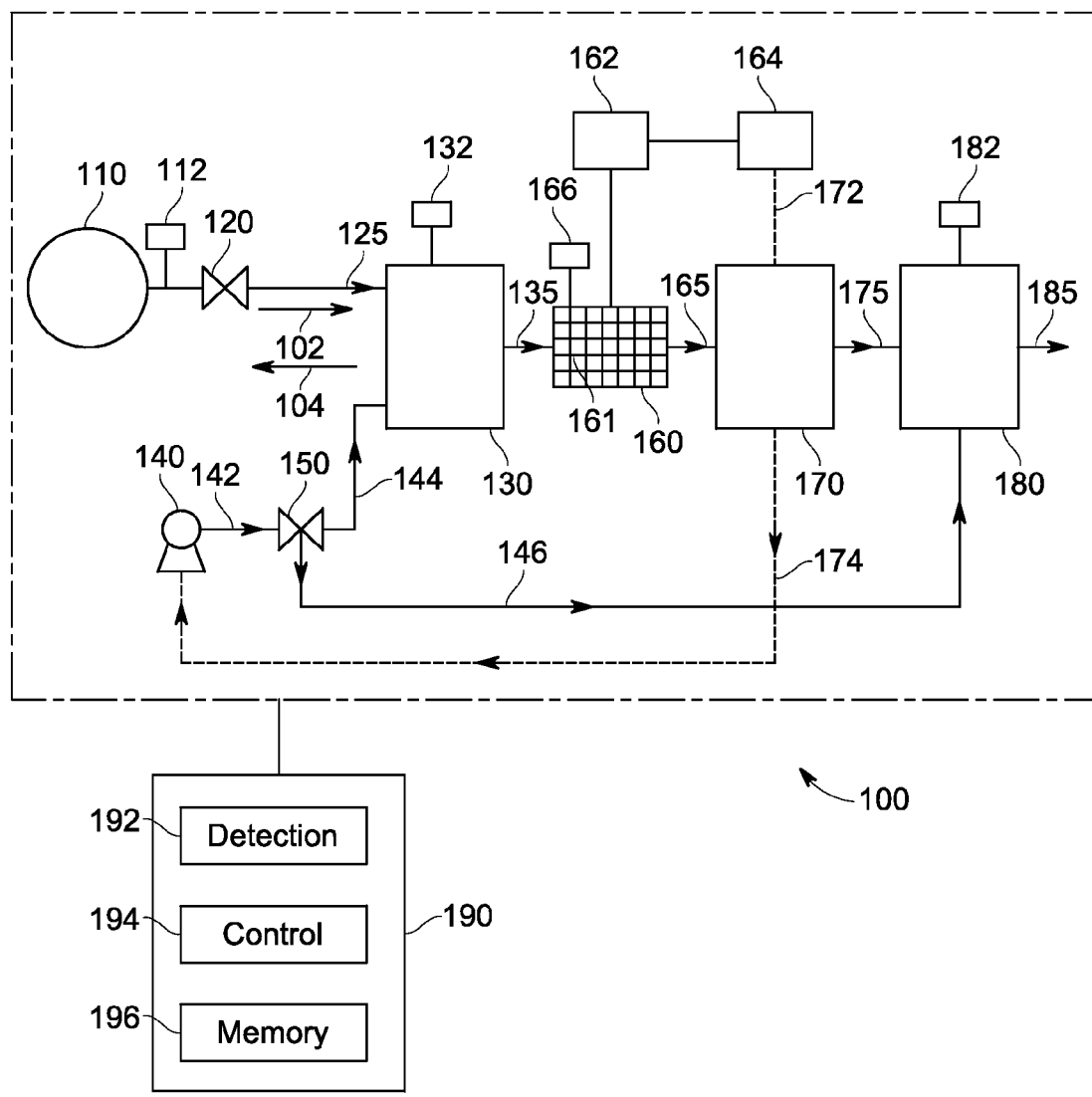
FIG. 1 is a schematic view of a system for oxidizing boil-off gas from a cryotank in accordance with various embodiments.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system" or "module" may include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. The modules shown in the attached figures may represent the hardware that operates based on software or hard-wired instructions, the software that directs hardware to perform the operations, or a combination thereof. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally speaking, various embodiments provide for reduced emission of combustible gases and/or otherwise potentially harmful emissions, while providing for relatively compact, lightweight oxidizing systems that are capable of providing all or a portion of the energy required for operation. Various embodiments utilize heat and/or other energy (e.g., mechanical energy used to turn a shaft) from an exhaust gas stream produced by an oxidizing system (e.g., a catalytic converter) for boil-off gas (e.g., boil-off gas from a cryotank). For example, heat from the exhaust gas may be used to preheat a stream of boil-off gas and/or a mixed stream (e.g., boil-off gas mixed with air) before oxidation of the boil-off gas. As another example, an exhaust stream may be used as an energy source for powering or actuating a blower used to mix the boil-off gas stream with an oxygen stream. Alternatively or additionally, supplemental power from a source external to a boil-off gas oxidation system may be used with one or more aspects of the boil-off gas oxidation system, such as a blower. Energy may be provided, for example, from one or more of a battery, capacitor or other energy storage device, an aircraft primary power distribution system, an aircraft secondary power distribution system, or the like.

Various embodiments are provided for oxidizing a boil-off gas of a cryogenic fluid (e.g., liquid natural gas (LNG)) stored in a cryotank, for example on-board an aircraft. At least one technical effect of various embodiments is a relatively lightweight system for handling boil-off gas. At least one technical effect of various embodiments provides for the treatment of boil-off gases using a system that requires little or no external power, for example, from an aircraft on which a cryotank system is disposed. At least one technical effect of various embodiments is reduction or elimination of combustible exhaust resulting from boil-off gas. At least one technical effect of various embodiments is reduced temperature of exhaust from a boil-off gas from a cryotank. Further, at least one technical effect of various embodiments is reduced potentially harmful emissions from boil-off gas.

FIG. 1 is a schematic view of a system 100 formed in accordance with an embodiment. The system 100 (along with other embodiments of systems and methods described herein) is discussed below in connection with LNG as a source of power, for example, for propulsion of an aircraft. In other embodiments, other fuels may be used and/or alternate applications may be powered. The illustrated system 100 includes a cryotank 110, a control valve 120, a mixing module 130, a blower 140, a splitter valve 150, an oxidation module 160, an energy generating module 170, a downstream mixing module 180, and a control module 190.

In general, boil-off gas (or a gas or other product formed using the boil-off gas) from the cryotank 110 is passed in a downstream direction 102 through aspects of the system 100. (An upstream direction 104 may be understood as the opposite direction of the downstream direction.) As the boil-off gas (or a gas or other product formed using the boil-off gas) passes through various aspects of the system, the boil-off gas (or a gas or other product formed using the boil-off gas) is treated or processed to reduce undesirable emissions (e.g., combustible emissions, emissions having a relatively higher temperature, emissions having an undesirable content, or the like). The boil-off gas may be directed through fluid conduits (such as piping, hosing, or the like) as will be appreciated by one having ordinary skill in the art. Further, additional fluid conduits (not shown) may be employed to direct a fluid (e.g., LNG) from the cryotank 110 toward one or more engines to be consumed as fuel.

As seen in FIG. 1, the system 100 defines a downstream direction 102 and an upstream direction 104. The downstream direction 102 may be understood as the direction or path followed by boil-off gas (or products of boil-off gas) as the boil-off gas (or products of boil-off gas) is treated or processed. In the illustrated embodiment, boil-off gas flows from the cryotank 110 via the control valve 120 as a boil-off gas stream 125. The boil-off gas stream 125 flows in the downstream direction to the mixing module 130. At the mixing module, the boil-off gas stream 125 is mixed with an oxygen stream 144 (e.g., from the blower 140) to produce a mixed stream 135 that is output in the downstream direction 102. The mixed stream 135 flows in the downstream direction 102 to the oxidation module 160. As the mixed stream 135 passes through the oxidation module 160, the boil-off gas in the mixed stream 135 is oxidized using the oxygen in the mixed stream 135, thus producing an exhaust stream 165 including products of the oxidation of the boil-off gas. These products, for example, water and carbon dioxide, may have preferential emission qualities to the boil-off gas (e.g., not combustible like the boil-off gas, having a lower global warming potential (GWP), or the like). The exhaust stream 165 may be passed in the downstream direction 102 through the energy generation module 170, where, for example, heat from the exhaust stream 165 may be used to provide electrical energy that may be used to operate the blower 140 and/or an ignition module 162 of the oxidation module 160. The exhaust stream 175 that has passed through the energy generation module 170, however, may still be at a relatively high temperature. The exhaust stream 175 may thus be passed in the downstream direction 102 through the downstream mixing module 180. As the exhaust stream 175 passes through the downstream mixing module 180, the exhaust stream 175 may be mixed with a cooling stream 146 (e.g., provided from the blower 140 via the splitter valve 150) to provide an exhaust stream 185 having a temperature reduced to an acceptable or desirable level (e.g., below a threshold exhaust temperature). The various flows of streams, amount of mixing between streams, setting of valves, and the like may be controlled by the control system 190. Thus, the system 100 may be understood as having an air entrainment portion that mixes the boil-off gas with oxygen (e.g., oxygen present in air from the atmosphere), an oxidation module that oxidizes the boil-off gas to improve emission quality, and a heat recovery portion that utilizes the exhaust stream from the oxidation portion to provide energy for operation of the system 100. In some embodiments, the heat recovery portion may be used to preheat the boil-off gas stream and/or the mixed stream upstream of the oxidation module. As used herein, a stream may be understood as a volume of fluid (e.g., gas) passing through at least a portion of a system. In various embodiments, the downstream mixing module 180 may not be present or employed, for example if the temperature of the exhaust stream 175 is low enough relative to system and/or regulatory requirements. For example, the exhaust stream 175 and/or the cooling stream 146 may be vented directly to the atmosphere.

The cryotank 110 in the illustrated embodiment is used to contain a cryogenic fluid. In various embodiments, the cryogenic fluid contained by the at least one cryogenic tank 110 may be any type of cryogenic fluid (which may be contained within the cryogenic tank 110 in liquid and/or gaseous form), such as, but not limited to, LNG, CNG, or the like. In some embodiments, the cryogenic tank 110 is a fuel tank on-board an aircraft for containing LNG or another cryogenic fluid that is used as fuel for an engine of the aircraft. The cryotank 110 (along with other aspects of the system 100) may be configured in some embodiments as a relatively permanent feature of an aircraft, while in other embodiments, the cryotank 110 and other aspects of the system 100 may be configured as a generally stand-alone unit that may readily be loaded or unloaded from an aircraft.

The cryotank 110, in some embodiments includes a shell and an internal reinforcement frame (not shown). The shell may define an internal volume that is bounded by an interior side of the shell, and may be configured to contain the cryogenic fluid within the internal volume. The cryotank 110 thus may define a closed container configured to hold the cryogenic fluid therein. The cryotank 110 may define a pressure vessel that is configured to hold the cryogenic fluid therein at a pressure that is different than ambient (e.g., atmospheric) pressure.

For example, as ambient temperature rises, LNG within the cryotank 110 will evaporate, producing a boil-off gas. As the amount of boil-off gas increases, the pressure within the cryotank 110 will increase. At some point, the pressure may become too large for the cryotank 110. In the illustrated embodiment, the system 100 includes a tank sensor 112. The tank sensor 112 is configured to sense or detect, directly or indirectly, when the pressure within the cryotank 110 exceeds a desired or acceptable level (e.g., a level selected from a range beneath a maximum pressure for which the cryotank 110 is designed to withstand or for which the cryotank 110 is rated). For example, the tank sensor 112 may include a pressure sensor configured to measure or detect the pressure within the cryotank 110.

The control valve 120 is configured to control a flow of boil-off gas out of the cryotank 110 in the downstream direction 102 into the mixing module 130. In the illustrated embodiment, the control valve 120 is interposed between the cryotank 110 and the mixing module 130, and is disposed downstream of the cryotank 110 and upstream of the mixing module 130. In some embodiments, the control valve 120 may be mounted inside, mounted to, or otherwise associated with the cryotank 110. In the illustrated embodiment, when a pressure exceeding a threshold is detected by the tank sensor 112, the control valve 120 opens to allow passage of boil-off gas in the downstream direction as the boil-off gas stream 125, thereby helping reduce the pressure in the cryotank 110.

In various embodiments, the boil-off gas may be passed from the cryotank 110 at a pressure slightly higher than atmospheric pressure and at the saturation temperature of natural gas (which may be lower than ambient temperature).

For example, the control valve 120 may be opened under the control of the control module 190 when the control module 190 determines that a pressure within the tank exceeds a threshold based on information provided to the control module 190 by the tank sensor 112. As the boil-off gas is allowed to flow from the cryotank 110, the tank pressure may be reduced. In some embodiments, the control valve 120 may be opened when the tank pressure exceeds a first threshold, and the control valve 120 may be closed when the tank pressure drops below a second threshold. For example, the control valve 120 may be opened when the pressure in the tank exceeds about 1.5 atmospheres, and the control valve 120 may be closed if the tank pressure drops below about 1.1 atmospheres after the control valve 120 is opened and boil-off gas is removed from the cryotank 110.

In the illustrated embodiment, the blower 140 is configured to provide oxygen to the oxidation module 160 via the mixing module 130. The blower 140, for example, may provide an oxygen stream as part of a stream of air (e.g., atmospheric air) passed through the blower 140. Thus, the oxygen stream may contain not only oxygen, but other gases found in the atmosphere, such as nitrogen. The blower 140 depicted in FIG. 1 provides an oxygen stream 142 to the splitter valve 150. Further, the blower 140 of the illustrated embodiment receives electrical power from the energy generating module 170 to operate the blower 140. In various embodiments, power may be received from a different power source additionally or alternatively. The blower 140 may be configured as an explosion proof blower having an about 0.75 horsepower (HP) draw and providing about 10 standard cubic feet per minute (scfm) of air flow to the splitter valve 150. In alternate embodiments, for example, the energy generating module may be configured as a turbine driven by the exhaust from the oxidation module 160, and the blower 140 may receive mechanical energy from the turbine via an output shaft driven by the turbine that is used to operate the blower 140. The amount of air provided by the blower 140 to the splitter valve 150 may be controlled, for example, by the controller 190.

The splitter valve 150 receives the oxygen stream 142 (e.g. an air flow including oxygen as a component thereof provided from the blower 140) and divides the oxygen stream 142 into an oxygen stream 144 and a cooling stream 146. In the illustrated embodiments, the oxygen stream 142 is directed to the mixing module 130, with oxygen from the oxygen stream 142 eventually being utilized to oxidize boil-off gas in the oxidation module 160. The cooling stream 146 in the illustrated embodiment is directed to the downstream mixing module 180, where the cooling stream (which may be at about ambient temperature) may be mixed with exhaust gases to cool the exhaust that is vented to the atmosphere. The proportions of the oxygen stream 142 from the blower 140 that are sent via the respective streams 144, 146 to the respective mixing modules 130, 180 may be controlled, for example, by the controller 190. In general, the amount of air directed to the mixing module 130 is selected to provide a desired equivalency ratio (e.g., the ratio of fuel (e.g., boil-off gas) to oxygen, where a ratio of 1 indicates just enough oxygen to oxidize the fuel), while the amount of air directed to the downstream mixing module 180 is selected to provide cooling to the exhaust stream 185 exiting the system 100 to the atmosphere. In some embodiments, a threshold exhaust temperature may be selected, with the amount of air directed to the downstream mixing module 180 selected to achieve an exhaust temperature at or below the threshold exhaust temperature. In other embodiments, an amount of air may be selected to be provided to the mixing module 130 via the oxygen stream 144 to provide a desired equivalency ratio, with any remaining flow directed to the downstream mixing module 180 via the cooling stream 146. Continuing with the above example scenario of the blower 140 providing 10 scfm, in some embodiments, about 1 scfm of air from the blower 140 may be directed to the mixing module 130 via the oxygen stream, and about 9 scfm of air from the blower 140 may be provided to the downstream mixing module 180. In various embodiments, air from the blower 140 may be provided to additional or alternative modules or in additional or alternative directions, for example via an additional splitter valve interposed between the splitter valve 150 and the downstream mixing module 180.

In the illustrated embodiment, the mixing module 130 is disposed downstream of the cryotank 110 and upstream of the oxidation module 160, and is configured to receive the boil-off gas stream 125 from the cryotank 110 via the control valve 120, as well as to receive the oxygen stream 144 from the blower 140 via the splitter valve 150. The mixing module 130 is further configured to mix the boil-off gas stream 125 and the oxygen stream 144 to produce a mixed stream 135 that is output from the mixing module 130 in the downstream direction 102 toward the oxidation module 160. The mixed stream 135 may be configured (e.g., by controlling the equivalence ratio, or the ratio of fuel to oxygen) to allow for oxidation of the boil off gas at a relatively safe temperature. The equivalence ratio may be understood as the ratio of fuel (e.g., boil-off gas from the boil off gas stream 135) to oxygen (e.g., oxygen from the oxygen stream 144). At an equivalence ratio of 1, there is just enough oxygen to completely convert or oxidize the boil-off gas. Generally, the highest operating temperature in the oxidation module 160 will be required when the equivalence ratio is around 1. By using a generally lower equivalence ratio, the boil-off gas may be completely oxidized while resulting in a lower temperature required to oxidize or convert the boil-off gas. For example, in some embodiments, the oxygen stream 144 from the blower 140 via the splitter valve 150 may be controlled to provide an equivalence ratio of about 0.1 (e.g., about ten times more oxygen in the mixed stream 135 than required to oxidize or convert the boil off gas). The mixing of the streams inside the mixing module 130 may be accomplished at a pressure above atmospheric pressure to account for system pressure loss and at equivalence ratios corresponding to below a lean burn-out limit of natural gas to avoid gas phase combustion.

The mixing module 130 depicted in FIG. 1 includes a mixing module sensor 132. The mixing module sensor 132 is configured to detect one or more operating parameters of the mixing module 130, such as flow into or out of the mixing module 130, temperature of the mixing module 130, equivalence ratio of the mixed stream 135, or the like. For example, the mixing module sensor 132 may include a first flow meter configured to detect the flow of the boil-off gas stream 125 and a second flow meter configured to detect the flow of the oxygen stream 144 into the mixing module 130, with the flows used to determine the equivalence ratio. To the extent the equivalence ratio (or a resulting operating temperature) deviates from a desired operating range or exceeds one or more operational thresholds, the oxygen stream 144 may be increased or decreased as required (e.g., by adjusting the flow from the blower 140 and/or the proportion of flow allowed to the mixing module 130 via the splitter valve 150).

In the illustrated embodiment, the oxidation module 160 is located downstream from the mixing module 130 and upstream from the energy generation module 170. The depicted oxidation module 160 includes a catalytic converter 161 (depicted by cross-hatching in FIG. 1) that is configured to oxidize the boil-off gas in the mixed stream 135 to produce an exhaust stream 165 that is output in the downstream direction 102 toward the energy generation module 170. The catalytic converter 161 may be configured to catalyze a conversion of methane to carbon dioxide and water by facilitating the oxidation of the methane. In the illustrated embodiment, the mixed stream 135 entering the oxidation module 160 includes methane (from the boil-off gas stream 125) and oxygen (from the oxygen stream 144). The methane and oxygen react together (e.g., the methane is oxidized) in the presence of a catalyst of the catalytic converter 161 to produce water and carbon dioxide. Because the oxygen stream 144 includes more oxygen than required to convert the boil-off gas, and because the oxygen stream 144 is taken from the atmosphere and thus includes additional atmospheric gases (e.g., nitrogen), the exhaust stream 165 includes not just the products of the oxidation (e.g., water vapor and carbon dioxide) but also oxygen, nitrogen, and the like. By oxidizing the natural gas to water vapor and carbon dioxide, the exhaust stream 165 has reduced combustibility and improved emission quality (e.g., global warming potential) than compared to if the natural gas had just been vented to the atmosphere from the cryotank 110. In some embodiments, the equivalence ratio is selected to provide an operating temperature in the oxidation module 160 that is lower than the ignition limit of natural gas. For example, in some embodiments, the operation is configured to oxidize the boil off gas at about 600 degrees Fahrenheit (about 315 degrees Celsius).

The oxidation module 160 may include an oxidation sensor 166 configured to sense, detect, or measure one or more operating parameters of the oxidation module 160. For example the oxidation sensor 166 may monitor a temperature of the oxidation module 160 and/or the equivalence ratio within the oxidation module 160. For example, the controller 190 may adjust the flow from the blower 140 and/or through the splitter valve 150 to adjust the equivalence ratio responsive to information regarding the equivalence ratio and/or temperature from the oxidation sensor 166 and/or the mixing module sensor 132.

In various embodiments, the catalytic converter 161 is configured to provide a catalyst and an oxidation surface, and is configured to facilitate oxidation of the boil-off gas while operating at a low enough temperature to minimize or eliminate flame ignition within the system 100. The oxidation surface, for example, may be in the form of a lattice structure formed using thin metal wires coated with a catalyst, a honeycomb structure with a catalyst coating, a ceramic substrate with porous voids coated with a catalyst, a collection of parallel tubes coated with a catalyst, or the like. In some embodiments, a lattice of the catalytic converter 161 may be stainless steel, Inco, other high temperature conducting alloy, or the like. In some embodiments, the catalytic converter 161 may include a ceramic coated and/or impregnated with Platinum (Pt), Palladium (Pd), and/or other catalytically active material.

The oxidation module 160 of the illustrated embodiment includes an ignition module 162, a battery 164, and the oxidation sensor 166 (discussed above). The ignition module 162, which is configured to receive energy from the battery 164, is configured to provide heating to the oxidation module 160 to facilitate the oxidation of an initial flow of boil-off gas and oxygen through the oxidation module 160. The battery 164 may be rechargeable, and may receive charging energy via path 172 from the energy generating module 170. Alternatively or additionally, the battery 164 and/or ignition module 162 may receive energy from other sources, such as a capacitor, an aircraft electrical system, or the like. When the oxidation module 160 has been operating for a sufficient time, a high enough operating temperature may be reached within the oxidation module 160 so that additional heating is not required. At the start of an oxidizing process, for example, when boil-off gas has just started to flow from the cryotank 110, the catalytic converter 161 may require heating to satisfactorily oxidize the boil-off gas. The ignition module 162 of the illustrated embodiment utilizes an electric heater that receives power from the battery 164. In other embodiments, other configurations of the ignition module 162 may be employed. For example, the ignition module 164 may include an induction heater, a pilot light, a spark plug, or the like. In some embodiments, the operation of the ignition module 162 may be controlled by the controller 190. For example, the controller 190 may receive information from the oxidation sensor 166 that the oxidation module 160 and/or mixed stream 135 entering the oxidation module 160 is at an insufficient temperature (e.g., below a threshold oxidation temperature) for desired operation of the catalytic converter 161. Responsive to the information from the oxidation sensor 166, the control module 190 may operate the ignition module 162 (e.g., turn the ignition module on and/or control an amount of heat or other energy provided by the ignition module 162) to heat the oxidation module 160. Once a satisfactory temperature has been reached, the ignition module 162 may be deactivated by the controller 190. The exhaust stream 165 from the oxidation module 160 may be at a relatively high temperature. In some embodiments, the exhaust stream 165 may be over 600 degrees Fahrenheit (315 degrees Celsius).

In various embodiments, various components are disposed within the system 100 to receive all or a portion of the exhaust stream 165 (or a product thereof), and to reduce the exhaust temperature for emission to the atmosphere, and/or to utilize the exhaust stream to generate energy that may be usefully employed elsewhere in the system, and/or to recuperate or exchange heat to pre-heat a flow including boil-off gas upstream of the oxidation module 160. In the embodiment depicted in FIG. 1, the system 100 includes an energy generating module 170 configured to generate energy using the exhaust stream 165 and a downstream mixer 180 configured to cool exhaust from the system 100 to the atmosphere.

In the illustrated embodiment, the energy generating module 170 is disposed downstream of the oxidation module 160 and upstream of the downstream mixer 180. The energy generation module 170 is configured to use the exhaust stream 165 to provide energy for operating at least a portion of the system. In some embodiments, the energy generation module 170 may be configured to provide the required energy to the battery 164 for operating the ignition module 162, as well as to the blower 140, so that the system 100 is energy self-sufficient, and does not require energy from a source external to the system 100 for normal operation. Thus, the system 100 may be configured to operate as a stand-alone unit that does not require external power, for example, to oxidize boil-off gas. In the illustrated embodiment, the energy generating module 170 provides electrical energy to the battery 164 via pathway 172, and provides electrical energy to the blower 140 via pathway 174. The transfer of energy from the energy generating module 170 to various other aspects of the system 100 may be controlled by the controller 190.

The energy generating module 170 depicted in FIG. 1 is configured as a thermoelectric power generation system. For example, the energy generating module may be configured as a thermoelectric generator or thermogenerator that converts heat directly into electrical energy. While these types of devices typically have relatively low efficiencies (e.g., about 5-10%), these devices may be relatively small and light in weight. In other embodiments, other types of energy generating modules may be employed. For example, the energy generating module 170 may include a turbine wheel actuated by the exhaust stream 165. A shaft of the turbine wheel may be used to actuate the blower 140. As another example, the energy generating module 170 may utilize the exhaust stream 165 as a heat sink within a heat engine to produce power. In some embodiments, the heat from the exhaust stream 165 may be used additionally or alternatively for thermal heat recuperation to pre-heat boil-off gas before entry into the oxidation module 160 (see, for example, discussion of heat exchangers in connection with FIGS. 2 and 3). Thus, in various embodiments, heat or motion of the exhaust stream 165 may be usefully employed as a source of energy for the system 100. In the illustrated embodiment, an exhaust stream 175 is exhausted from the energy generating module 170 in the downstream direction 102 toward the downstream mixing module 180.

The exhaust stream 175 leaving the energy generation module 170 may be at a lower temperature than the exhaust stream 165 leaving the oxidation module 160, but the exhaust stream 175 may be at a higher temperature than is desired to be exhausted to the atmosphere. For example, the exhaust stream 175 may be within a temperature range of about 350 to about 650 degrees Fahrenheit. Thus, the downstream mixing module 180 may be used to cool the exhaust stream 175 to produce an exhaust stream 185 having a lower temperature than the exhaust stream 175, with the cooled exhaust stream 185 vented to the atmosphere. The downstream mixing module 180 may, in some embodiments, receive a cooling flow of air or other gas from a dedicated supply (not shown). In the illustrated embodiment, the downstream mixing module 180 is configured to receive the exhaust stream 175 from the energy generation module 170 and the cooling stream 144 from the blower 140 via the splitter valve 150, and to mix the exhaust stream 175 and the cooling stream 144 to produce a cooled exhaust stream 185 that may be vented to the atmosphere. The cooling stream 144 may be at about ambient temperature, and thus may be used to cool the exhaust stream 175.

The downstream mixing module 180 in some embodiments may be controlled to maintain the temperature of the exhaust stream 185 at or below a threshold temperature. For example, in some embodiments, the downstream mixing module 180 may be controlled to provide an exhaust stream 185 having a temperature of about 120 degrees Fahrenheit or lower. The downstream mixing module 180 depicted in FIG. 1 includes a downstream mixing sensor 182 configured to detect or sense an operating parameter associated with the downstream mixing module 180. For example, the downstream mixing sensor 182 may detect a temperature of the exhaust stream 175 entering the downstream mixing module 180 and/or the exhaust stream 185 exiting the downstream mixing module 180. The controller 190 may then control the flow of the cooling stream 144 to the downstream mixing module 180 responsive to information received from the downstream mixing sensor 182. In one example scenario, where the controller 190 determines an increased cooling flow is required to reduce the temperature of the exhaust stream 185, an increased amount of air may be provided to the downstream mixing module 180 via the cooling stream 144 by increasing the output of the blower 140 and/or increasing the proportion of air directed to the cooling stream 144 via the splitter valve 150.

As also indicated above, the controller 190 may be operably connected to and configured to control operations of the various components of the system. The controller 190 may be configured as a computer processor or other logic-based device that performs operations based on one or more sets of instructions (e.g., software). The instructions on which the controller 190 operates may be stored on a tangible and non-transitory (e.g., not a transient signal) computer readable storage medium, such as a memory 196. The memory 196 may include one or more computer hard drives, flash drives, RAM, ROM, EEPROM, and the like. Alternatively, one or more of the sets of instructions that direct operations of the controller 190 may be hard-wired into the logic of the controller 190, such as by being hard-wired logic formed in the hardware of the controller 190.

The controller 190 of the illustrated embodiment includes a detection module 192, a control module 194, and a memory module 196 associated therewith. The detection module 192 is configured to receive information from sensors or detectors associated with the system (e.g., sensors 112, 132, 166, 182 discussed above). The detection module 192 may also process the received information to determine one or more operating parameters of the system 100 (e.g., a temperature, pressure, amount of flow, equivalence ratio, or the like). The control module 194 is configured to receive information from the detection module 192 and to control operation of the system 100 responsive to the received information. For example, the control module 194 may be configured to open, close, or adjust one or more valve settings to adjust flow through the system, or, as another example, may be configured to control operation of the ignition module 162 to achieve a desired temperature within the oxidation module 160. By way of example, the controller 190 in the illustrated embodiment may, responsive to information received from sensors or detectors, control the output of the blower 140 (e.g., to change a total amount of air flow available to the mixing module 130 and/or the downstream mixing module 180 to control the equivalence ratio and/or the exhaust temperature), control the settings of the splitter valve 150 (e.g., to change the proportion of air flow from the blower 140 being directed to the mixing module 130 or the downstream mixing module 180), control the settings of the control valve 120 (e.g., to permit or prohibit flow of boil-off gas from the cryotank 110 responsive to a determine pressure of the cryotank 110), control power transferred from the energy generation module 170 to the blower 140 and/or the ignition module 160, control operation of the ignition module 162 (e.g., to control the ignition module 162 to provide heat to the catalytic converter 161 if a determined temperature of the ignition module 160 is below a desired operation temperature), or the like. As another example, in embodiments utilizing one or more heat exchangers, the controller 190 may be configured to control settings of various valves or other components to direct the various flows through the heat exchanger(s).

Thus, in various embodiments, a relatively compact and lightweight system may be provided that safely and effectively oxidizes boil-off gas, reduces harmful emissions, and/or utilizes energy from an exhaust of the oxidation process to operate various aspects of the system. In some embodiments, the system may be energy self-sufficient and not require power from an external source (e.g., an aircraft on which the system is disposed) for normal operation for the oxidation of boil-off gas from a cryotank. In various embodiments, different arrangements of components may be employed.

Figure 2:
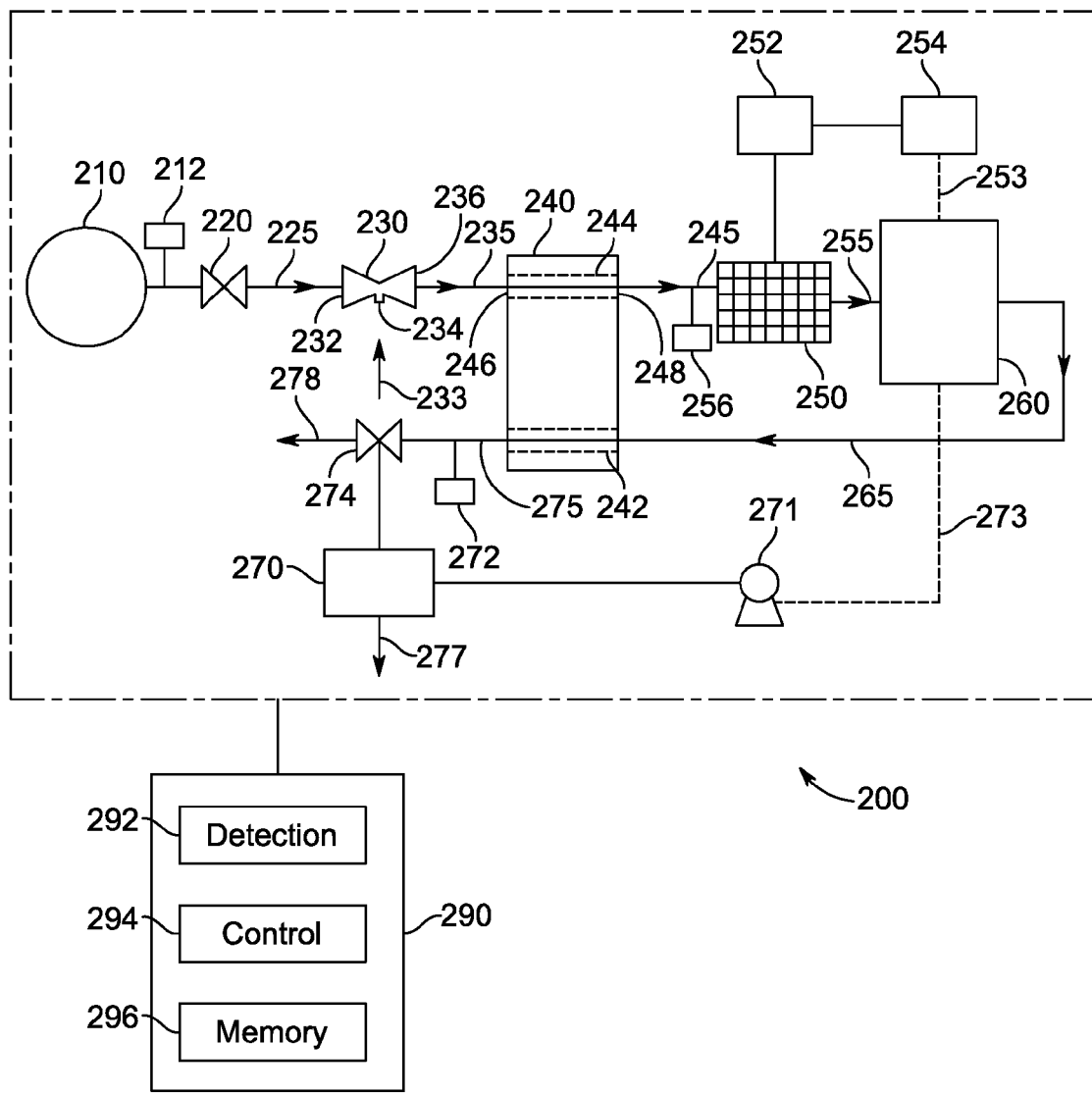
FIG. 2 is a schematic view of a system for oxidizing boil-off gas from a cryotank in accordance with various alternate embodiments.

For example, FIG. 2 is a schematic view of a system 200 formed in accordance with an embodiment. The system 200 may be generally similar in respects to the system 100 discussed above. However, as depicted in FIG. 2, the system 200 includes a heat exchanger for heating a mixed stream before entry into an oxidation module, and uses an ejector as a mixing module.

As depicted in FIG. 2, the system 200 includes a cryotank 210, a control valve 220, an ejector 230, a heat exchanger 240, an oxidation module 250, an energy generation module 260, and a downstream mixer 270. In the embodiment depicted in FIG. 2, boil-off gas from the cryotank 210 passes in a downstream direction as a boil-off gas stream 225 through the control valve 220 and into the ejector 230. The boil-off gas stream 225 is mixed with an oxygen stream 233 (e.g., atmospheric air including oxygen) at the ejector 230 to form a mixed stream 235 passed downstream through the heat exchanger 240 to the oxidation module 250. The mixed stream 235 is heated in the heat exchanger 240 using heat from an exhaust stream 265 to produce a pre-heated mixed stream 245 that is passed downstream through the oxidation module 250 to convert boil-off gas and oxygen to water and carbon dioxide, and passed out of the oxidation module 250 as an exhaust stream 255. The exhaust stream 255 is passed through the energy generation module 260, which may utilize heat from the exhaust stream 255 to produce electrical power, and an exhaust stream 265 exits from the energy generation module. The exhaust stream 265 then passes through the heat exchanger 240, where the exhaust stream 265 is used to pre-heat the mixed stream 235 before oxidation. The exhaust stream 275 that exits the heat exchanger 240 may be cooled by a downstream mixing module 270 and vented to the atmosphere as a cooled exhaust stream 277, or may be vented directly to the atmosphere without further treatment or processing (e.g., if the exhaust stream 275 is at or below a threshold desired exhaust temperature, the exhaust stream 275 may be released to the atmosphere without further cooling). The system 200 also includes a control module 290 configured to control the operation of various aspects of the system 200.

The cryotank 210 in the illustrated embodiment is used to contain a cryogenic fluid, and may be substantially similar in many respects to the cryotank 110 discussed above. In various embodiments, the cryogenic fluid contained by the cryogenic tank 210 may be any type of cryogenic fluid (which may be contained within the cryogenic tank 210 in liquid and/or gaseous form), such as, but not limited to, LNG and/or the like. In some embodiments, the cryotank 210 is a fuel tank on-board an aircraft for containing LNG or another cryogenic fluid that is used as fuel for an engine of the aircraft.

The cryotank 210 may define a pressure vessel that is configured to hold the cryogenic fluid therein at a pressure that is different than ambient (e.g., atmospheric) pressure. As ambient temperature rises, LNG within the cryotank 210 may evaporate, producing a boil-off gas, and increasing the pressure within the cryotank 210. The system 200 depicted in FIG. 2 includes a tank sensor 212 configured to sense or detect when the pressure within the cryotank 210 exceeds a desired or acceptable level (e.g., a level selected from a range beneath a maximum pressure at which the cryotank 210 may be designed to withstand or for which the cryotank 210 is rated), with the control valve 220 configured to control a flow of boil-off gas out of the cryotank 210 in a downstream direction when the pressure inside the cryotank 210 exceeds a desired pressure. In the illustrated embodiment, the control valve 220 is interposed between the cryotank 210 and the ejector 230, and is disposed downstream of the cryotank 210 and upstream of the ejector 230. In the illustrated embodiment, when a pressure exceeding a threshold is detected by the tank sensor 212, the control valve 220 opens to allow passage of boil-off gas in the downstream direction as the boil-off gas stream 225, thereby helping reduce the pressure in the cryotank 210. The control valve 220 may be generally similar in many respects to the control valve 120 previously discussed, and may be generally similarly controlled by the controller 290.

The boil-off gas stream 225 then passes downstream to the ejector 230. The ejector 230 is configured to mix the boil-off gas stream 225 with oxygen (e.g., an air stream comprising atmospheric air that includes oxygen) to produce the mixed stream 235 that is passed to the heat exchanger 240. The ejector 230 is an example of a mixing module. The ejector 230 of the illustrated embodiment does not require a blower to provide an air stream to mix with the boil-off gas stream, but instead uses the velocity of the boil-off gas stream 125 from cryotank 210 to entrain air. The ejector 230 (which may also be known as an ejector pump, injector, eductor-jet pump, or thermocompressor) of the illustrated embodiment utilizes the Venturi effect of a converging-diverging nozzle to convert pressure energy of a motive fluid (e.g., boil-off gas stream 225) to velocity energy (or kinetic energy). The velocity energy is used to create a low pressure zone that entrains a suction fluid (e.g., oxygen stream 233) and creates a mixed stream by mixing the motive fluid (e.g., the boil-off gas stream 225) and the suction fluid (e.g., the oxygen stream 233). The mixed stream (e.g., mixed stream 235) then passes a throat of the injector and expands, reducing the velocity and increasing the pressure of the mixed stream (converting the velocity energy back into pressure energy).

In the illustrated embodiment, the ejector 230 is disposed downstream of the cryotank 210 and upstream of the oxidation module 250, and is configured to receive the boil-off gas stream 225 from the cryotank 210 via the control valve 220, as well as to receive an oxygen stream 233. In the illustrated embodiment, the oxygen stream 233 is a flow of atmospheric air (which includes oxygen) entrained into the ejector 230 from the surrounding atmosphere. The ejector 230 depicted in FIG. 2 includes an inlet 232, a suction inlet 234, and an outlet 236. The inlet 232 is configured to receive the boil-off gas stream 225 and the suction inlet 234 is configured to receive the oxygen stream 233 that is entrained by the ejector 230 using the boil-off gas stream 225. The boil-off gas stream 225 and the oxygen stream 233 are mixed in the ejector 230 and passed downstream through the outlet of the ejector 230.

As also discussed above, the mixed stream 235 may be configured (e.g., by controlling the equivalence ratio, or the ratio of fuel to oxygen) to allow for oxidation of the boil off gas at a relatively safe temperature. By using a generally lower equivalence ratio, the boil-off gas may be completely oxidized while resulting in a lower temperature required to oxidize or convert the boil-off gas. For example, in some embodiments, the ejector 230 may be configured and/or controlled to provide an equivalence ratio of about 0.1 (e.g., about ten times more oxygen in the mixed stream 235 than required to oxidize or convert the boil off gas).

The mixed stream 235 exiting the ejector 230 next enters the heat exchanger 240 as the mixed stream 235 proceeds downstream. More particularly, the mixed stream 235 enters a passageway where the mixed stream 235 is heated by an exhaust stream resulting from oxidation of the boil-off gas passing through a different passageway of the heat exchanger 240. The heat exchanger 240 includes a first passage 242 and a second passage 244. The first passage 242 is configured to receive an exhaust stream 265 (e.g., a post-oxidation stream including products of oxidation such as water and carbon dioxide) that is at a relatively high temperature (e.g., about 350-650 degrees Fahrenheit). The second passage 244 is configured to receive the mixed stream 235 that is at relatively low temperature. For example, the mixed stream 235 may be at about an ambient temperature. Heat from the exhaust stream 265 is used to heat the mixed stream 235 (the exhaust stream 265 may also be viewed as being cooled by the mixed stream 235). The second passage 244 includes an inlet 246 configured to receive the mixed stream 235 and an outlet 248 through which a heated mixed stream 245 passes downstream to the oxidation module 250. Thus, the heat exchanger 240 may act to pre-heat the mixed stream before oxidation, which may, for example, reduce a time of heating or amount of heat required to be provided to the oxidation module by an ignition module, as well as reduce the temperature of an exhaust stream vented to the atmosphere.

The heated mixed stream 245 passes downstream from the outlet 248 of the second passage 244 of the heat exchanger 240 to the oxidation module 250, where the boil-off gas of the mixed stream 245 is oxidized to convert the boil-off gas to inert products of oxidation (e.g., water, carbon dioxide) that are less combustible and are generally less harmful as emissions. The oxidation module 250 may be configured generally similarly to the oxidation module 160 discussed above. In the illustrated embodiment, the oxidation module 250 is located downstream from the ejector 230 and upstream from the energy generation module 260. Due to the oxidation or conversion of the natural gas to water vapor and carbon dioxide, the exhaust stream 255 has reduced combustibility and improved emission quality (e.g., global warming potential) than compared to if the natural gas had just been vented to the atmosphere from the cryotank 210. In some embodiments, the oxidation module 250 is configured and controlled so that the oxidation module 250 oxidizes the boil off gas at an operating temperature of about 600 degrees Fahrenheit (about 315 degrees Celsius).

The oxidation module 250 may include an oxidation sensor 256 configured to sense, detect, or measure one or more operating parameters of the oxidation module 250. For example, the oxidation sensor 256 may monitor a temperature of the oxidation module 250 and/or the equivalence ratio within the oxidation module 250. For example, the controller 290 may adjust one or more settings of the ejector 230 to adjust the equivalence ratio responsive to information regarding the equivalence ratio and/or temperature from the oxidation sensor 256.

The oxidation module 250 of the embodiment depicted in FIG. 2 includes an ignition module 252, a battery 254, and the oxidation sensor 256 (discussed above). The ignition module 252, the battery 254, and the oxidation sensor 256 may be configured generally similarly to the ignition module 162, battery 164, and oxidation sensor 166 previously discussed. For example, the ignition module 252 may be configured to receive energy from the battery 254 and to provide heating to the oxidation module 250 to facilitate the oxidation of an initial flow of boil-off gas and oxygen through the oxidation module 250. The battery 254 may be rechargeable, and may receive charging energy via path 253 from the energy generating module 260. As also discussed above, in some embodiments, the operation of the ignition module 252 may be controlled by the controller 290. The exhaust stream 255 from the oxidation module 250 may be at a relatively high temperature. In some embodiments, the exhaust stream 255 may be over 600 degrees Fahrenheit (315 degrees Celsius).

The heat of the exhaust stream 255 in the illustrated embodiment is used to generate energy for use by the system 200 and also to pre-heat the mixed stream 235 to provide the heated mixed stream 245 that is provided to the oxidation module 250. The energy generation module 260 receives the exhaust stream 255 and generates energy using the exhaust stream 255. The energy generation module 260 may be configured generally similarly in many respects to the energy generation module 170 discussed above. For example, the energy generation module 260 may be configured to provide charging electrical energy to the battery 254 via a pathway 253, and/or energy for operating a blower 271 associated with the downstream mixing module 270 via pathway 273.

The exhaust stream 265 from the energy generation module, which may still be at a relatively high temperature (e.g., about 350-650 degrees Fahrenheit) may next pass through the first passage 242 of the heat exchanger 240, where heat from the exhaust stream 265 is passed to the mixed stream 235 so that the temperature of the mixed stream 235 increases and the temperature of the exhaust stream 265 decreases as the streams pass through the heat exchanger 240, with an exhaust stream 275 exiting the heat exchanger 240 and passing toward the downstream mixing module. In the illustrated embodiment, the exhaust sensor 272 senses the temperature of the exhaust stream 275. If the temperature is determined to be above a threshold temperature for venting to the atmosphere, the exhaust stream 275 may be directed via the valve 274 to the downstream mixing module 277, where the exhaust stream 275 is mixed with air provided from the blower 271 to provide a reduced temperature exhaust stream 277 that may be vented to the atmosphere. If the temperature of the exhaust stream 275 is satisfactory for venting to the atmosphere, the valve 274 may be operated to bypass the downstream mixing module 270 and be vented to the atmosphere along path 278.

Various determinations, for example, of whether flows or temperatures satisfy thresholds, may be made by the controller 290, which may also control the settings or operations of various aspects of the system 200, such as the ejector 230, the ignition module 252, various valves, or the like. The controller 290 may be configured substantially similarly to the controller 190 discussed above in many respects. For example, the controller 290 may be operably connected to and configured to control operations of the various components of the system 200. The controller 290 may be configured as a computer processor or other logic-based device that performs operations based on one or more sets of instructions (e.g., software). The instructions on which the controller 290 operates may be stored on a tangible and non-transitory (e.g., not a transient signal) computer readable storage medium, such as a memory 296. The memory 296 may include one or more computer hard drives, flash drives, RAM, ROM, EEPROM, and the like. Alternatively, one or more of the sets of instructions that direct operations of the controller 290 may be hard-wired into the logic of the controller 290, such as by being hard-wired logic formed in the hardware of the controller 290.

The controller 290 of the illustrated embodiment includes a detection module 292, a control module 294, and a memory module 296 associated therewith. The detection module 292 is configured to receive information from sensors or detectors associated with the system 200. The detection module 292 may also process the received information to determine one or more operating parameters of the system 200 (e.g., a temperature, pressure, amount of flow, equivalence ratio, or the like). The control module 294 is configured to receive information from the detection module 292 and to control operation of the system 200 responsive to the received information. For example, the control module 294 may be configured to open, close, or adjust one or more valve settings to adjust flow through the system, or, as another example, may be configured to control the settings of the ejector 230 to provide a desired amount of flow and/or equivalence ratio based on information received from sensors or detectors. As also indicated above, various components may be added, removed, or provided in different arrangements in various embodiments.

Figure 3:
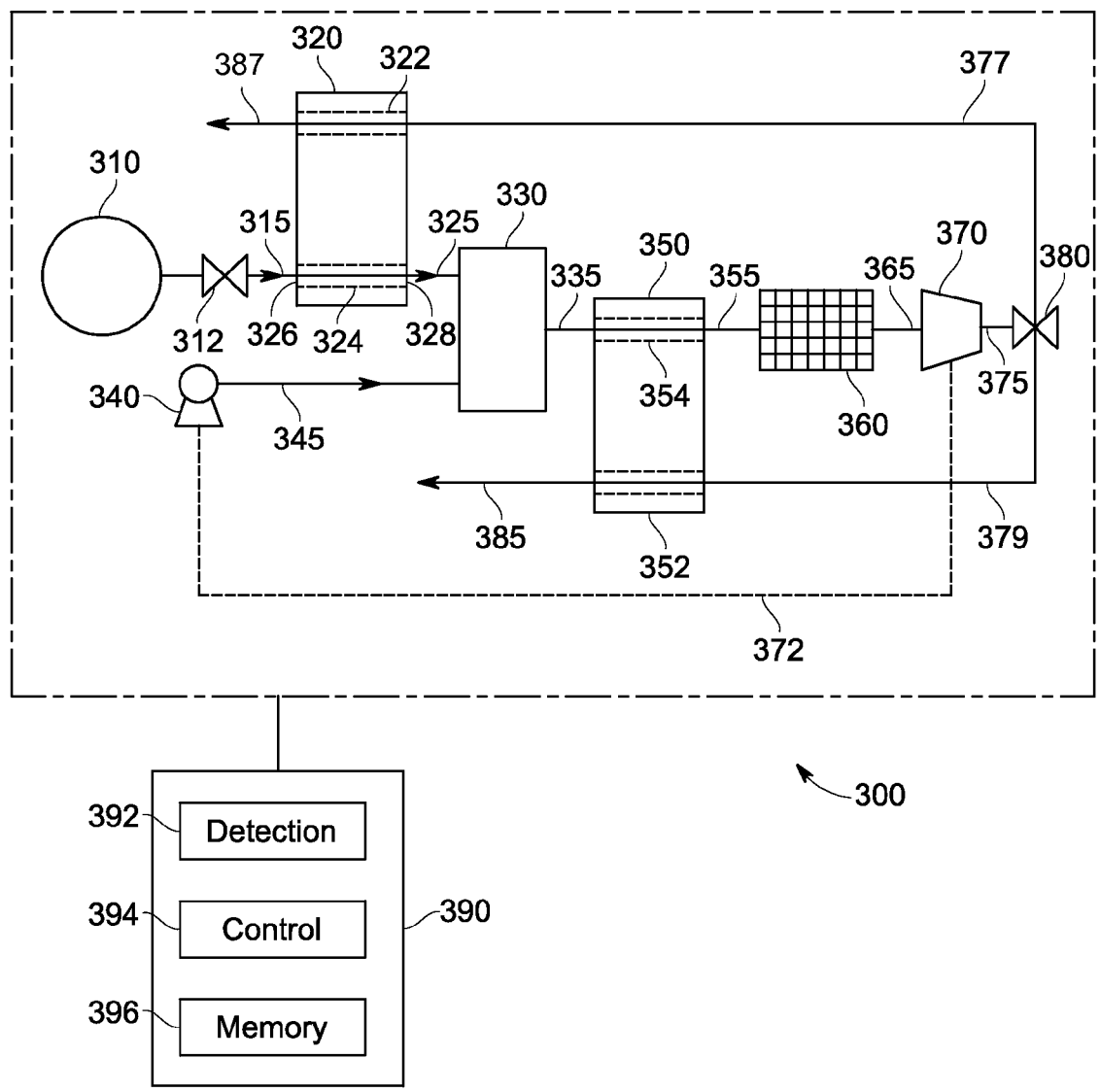
FIG. 3 is a schematic view of a system for oxidizing boil-off gas from a cryotank in accordance with various additional alternate embodiments.

For example, FIG. 3 is a schematic view of a system 300 formed in accordance with an embodiment. The system 300 may be generally similar in respects to the systems 100 and 200 discussed above. However, as depicted in FIG. 3, the system 300 includes an additional heat exchanger for heating a boil-off gas stream before entry into mixing module, and also utilizes a turbine as an example of an energy generation module located downstream of an oxidation module.

The boil-off gas stream 315 directed from the cryotank 310 may be at a pressure slightly higher than atmospheric pressure and at a saturation temperature of natural gas. The boil-off gas stream 315 may be heated by the heat exchanger 320 (e.g., via exhaust gases from the oxidation process) to produce a heated boil-off gas stream 325 that has a temperature that has been increased closer to ambient temperature to, for example, minimize or avoid water condensation associated with mixing.

As depicted in FIG. 3, the system 300 includes a cryotank 310, a control valve 312, a pre-mixing heat exchanger 320, a mixing module 330, a post-mixing heat exchanger 350, an oxidation module 360, a turbine 370, an exhaust splitter valve 380, and a controller 390. In the embodiment depicted in FIG. 3, boil-off gas from the cryotank 310 passes in a downstream direction as a boil-off gas stream 315 through the control valve 312 and into the pre-mixing heat exchanger 320, where the boil-off gas stream 315 is heated (e.g., via a heat exchange with a first exhaust stream 377 at a higher temperature than the boil-off gas stream 315) to provide a heated boil-off gas stream 325 that is passed downstream to the mixing module 330. The heated boil-off gas stream 325 is mixed with an oxygen stream 345 (e.g., atmospheric air including oxygen) at the downstream mixing module 330 to form a mixed stream 335 that is in turn passed downstream through the post-mixing heat exchanger 350 to the oxidation module 360. The mixed stream 335 is heated in the post-mixing heat exchanger 350 using heat from a second exhaust stream 379 to produce a heated mixed stream 355 that is passed downstream through the oxidation module 360 to convert the boil-off gas and oxygen to water and carbon dioxide, and passed out of the oxidation module 360 as an exhaust stream 365. The exhaust stream 365 is passed through the turbine 370, which may provide mechanical energy (e.g., via an output shaft turned as the exhaust stream 365 passes through the turbine 370), and an exhaust stream 375 exits from the turbine 370. The exhaust stream 375 is then split at the splitter valve 380 into a first exhaust stream 377 that passes through the pre-mixing heat exchanger 320, and a second exhaust stream 379 that passes through the post-mixing heat exchanger 350. In other embodiments, a common exhaust stream may pass through both heat exchangers. Thus, the heating fluid streams may be arranged in parallel in some embodiments, and in series in other embodiments. At the heat exchangers, as also indicated above, the exhaust gases are used to heat the boil-off gas stream 315 and the mixed stream 335. The exhaust streams 385, 387 that exit the heat exchangers may be cooled by one or more downstream mixing modules (not shown) and vented to the atmosphere as a cooled exhaust stream, or may be vented directly to the atmosphere without further treatment or processing (e.g., if the exhaust streams are at or below a threshold desired exhaust temperature). The system 300 also includes a control module 390 configured to control the operation of various aspects of the system 300.

The cryotank 310 in the illustrated embodiment is used to contain a cryogenic fluid, and may be substantially similar in many respects to the cryotanks 110, 210 discussed above. In various embodiments, the cryogenic fluid contained by the cryogenic tank 310 may be any type of cryogenic fluid (which may be contained within the cryogenic tank 310 in liquid and/or gaseous form), such as, but not limited to, LNG and/or the like. In some embodiments, the cryotank 310 is a fuel tank on-board an aircraft for containing LNG or another cryogenic fluid that is used as fuel for an engine of the aircraft.

As also discussed above, as ambient temperature rises, LNG within the cryotank 310 may evaporate, producing a boil-off gas, and increasing the pressure within the cryotank 310. A tank sensor (not shown) may be configured to sense or detect when the pressure within the cryotank 310 exceeds a desired or acceptable level, with the control valve 312 configured to control a flow of boil-off gas out of the cryotank 310 in a downstream direction when the pressure inside the cryotank 310 exceeds a desired pressure. The control valve 312 may be generally similar in many respects to the control valves 120, 220 previously discussed, and may be generally similarly controlled by the controller 290. In the illustrated embodiment, the control valve 312 is interposed between the cryotank 310 and the pre-mixing heat exchanger 320. In the illustrated embodiment, when a pressure exceeding a threshold is detected by the tank sensor 312, the control valve 312 is opened to allow passage of boil-off gas in the downstream direction as the boil-off gas stream 315. In various embodiments, the boil-off gas may be passed from the cryotank 310 at a pressure slightly higher than atmospheric pressure and at the saturation temperature of natural gas (which may be lower than ambient temperature). The boil-off gas stream 315 in the illustrated embodiment is directed through the pre-mixing heat exchanger 320, where the boil-off gas stream 315 is heated, for example, to help minimize or prevent condensation.

As indicated above, the boil-off gas stream 315 exiting the cryotank 310 next enters the pre-mixing heat exchanger 320. More particularly, the boil-off gas stream 315 enters a passageway where the boil-off gas stream 315 is heated by an exhaust stream resulting from oxidation of the boil-off gas passing through a different passageway of the pre-mixing heat exchanger 320. The pre-mixing heat exchanger 320 includes a first passage 322 and a second passage 324. The first passage 322 is configured to receive an exhaust stream 377 (e.g., a post-oxidation stream including products of oxidation such as water and carbon dioxide) that is at a relatively high temperature (e.g., about 350-650 degrees Fahrenheit). The second passage 324 is configured to receive the boil-off gas stream 315 that is at relatively low temperature (e.g., the boil-off gas stream may be below ambient temperature). Heat from the exhaust stream 377 is used to heat the boil-off gas stream 315 (the exhaust stream 377 may also be viewed as being cooled by the boil-off gas stream 315). The second passage 324 includes an inlet 326 configured to receive the boil-off gas stream 315 and an outlet 328 through which a heated boil-off gas stream 325 passes downstream to the mixing module 330. Thus, the pre-mixing heat exchanger 320 may act to pre-heat the boil-off stream before mixing, which may, for example, reduce or eliminate condensation.

The heated boil-off gas stream 325 passes downstream from the outlet 328 of the second passage 324 of the pre-mixing heat exchanger 320 to the mixing module 330, where the heated boil-off gas stream 325 is mixed with an oxygen stream 345 provided by the blower 340. The mixing module 330 and the blower 340 may be configured generally similarly in respects to the mixing module 130 and blower 140 discussed previously.

A mixed stream 335 (formed by mixing the heated boil-off gas stream 325 and the oxygen stream 345) is passed downstream from the mixing module 330 to the post-mixing heat exchanger 350. The mixed stream 335 next enters the post-mixing heat exchanger 350 as the mixed stream 335 proceeds downstream. The post-mixing heat exchanger 350 may be configured generally similarly in respects to the heat exchanger 240 discussed above. For example, the mixed stream 335 enters a passageway where the mixed stream 335 is heated by an exhaust stream resulting from oxidation of the boil-off gas passing through a different passageway of the post-mixing heat exchanger 350. The post-mixing heat exchanger 350 includes a first passage 252 that is configured to receive an exhaust stream 379 (e.g., a post-oxidation stream including products of oxidation such as water and carbon dioxide) that is at a relatively high temperature (e.g., about 350-650 degrees Fahrenheit). The post-mixing heat exchanger 350 also includes a second passage 354 that is configured to receive the mixed stream 335 that is at relatively low temperature (e.g., a temperature that is lower than the exhaust stream 379). Heat from the exhaust stream 379 is used to heat the mixed stream 335 (the exhaust stream 379 may also be viewed as being cooled by the mixed stream 335). Thus, the post-mixing heat exchanger 350 may act to pre-heat the mixed stream 335 before oxidation, which may, for example, reduce a time of heating or amount of heat required to be provided to the oxidation module by an ignition module, as well as reduce the temperature of an exhaust stream vented to the atmosphere.

The heated mixed stream 355 passes downstream from an outlet of the second passage 354 of the post-mixing heat exchanger 350 to the oxidation module 360, where the boil-off gas of the mixed stream 355 is oxidized to convert the boil-off gas to inert products of oxidation (e.g., water, carbon dioxide) that are less combustible and are generally less harmful as emissions. The oxidation module 360 may be configured generally similarly to the oxidation modules 160, 250 discussed above. In the illustrated embodiment, the oxidation module 360 is located downstream from the mixing module 330 and upstream from the turbine 370. Due to the oxidation or conversion of the natural gas to water vapor and carbon dioxide, the exhaust stream 365 produced by the oxidation module 360 has reduced combustibility and improved emission quality (e.g., global warming potential) than compared to if the natural gas had just been vented to the atmosphere from the cryotank 310. In some embodiments, the oxidation module 360 is configured and controlled so that the oxidation module 360 oxidizes the boil off gas at an operating temperature of about 600 degrees Fahrenheit (about 315 degrees Celsius).

The exhaust stream 365 next passes downstream through the turbine 370. The turbine 370 provides an example of an energy generation module. The turbine 370 depicted in FIG. 3 is configured to provide mechanical energy to the blower 340. In the illustrated embodiment, the flow of the exhaust stream. 365 is used to produce a rotation of an output shaft via the passage of the exhaust stream 365 through the turbine 370. The output shaft may be coupled to or associated with the blower 340, so that the turbine 370 may be used to actuate the blower 340. The coupling of the blower 340 and the turbine 370 via one or more output shafts is depicted schematically in FIG. 3 by the dashed line 372.

The exhaust stream 375 passes downstream from the turbine 370 to the exhaust splitter valve 380. The exhaust splitter valve 380 (for example, under the control of the controller 390, which determines a desired proportional distribution of the exhaust stream 375 responsive to information received from sensors or detectors of the system 300) may be used to control the proportion of the exhaust stream 375 that is directed respectively to the pre-mixing heat exchanger 320 and the post-mixing heat exchanger 350. For example, if it is determined that more heat is desirable for heating the boil-off gas stream 315 before mixing with an oxygen stream, the splitter valve 380 may be controlled to direct relatively more flow along the first exhaust stream 377 to the pre-mixing heat exchanger 320. As another example, if it is determined that increased heating is more desirably applied after mixing, more flow from the exhaust stream 375 may be directed by the splitter valve 380 along the second exhaust path 379 to the post-mixing heat exchanger 350.

The first exhaust stream 377 passes through the pre-mixing heat exchanger 320, where the first exhaust stream 377 is cooled and the boil-off gas stream 315 is heated. A first cooled exhaust stream 387 is passed from the pre-mixing heat exchanger 320 (the first cooled exhaust stream 387 is at a lower temperature than the first exhaust stream 377, as heat has been exchanged from the first exhaust stream 377 to the boil-off gas stream 315). In some embodiments, if the first cooled exhaust stream 387 is above a desired temperature for venting to the atmosphere, the first cooled exhaust stream 387 may be further cooled via a downstream mixing module (not shown). For example, the downstream mixing module may be substantially similar in respects to the downstream mixing modules discussed above.

Similarly, the second exhaust stream 379 passes through the post-mixing heat exchanger 350, where the second exhaust stream 379 is cooled and the mixed stream 335 is heated. A second cooled exhaust stream 385 is passed from the post-mixing heat exchanger 350 (the second cooled exhaust stream 385 is at a lower temperature than the second exhaust stream 379, as heat has been exchanged from the second exhaust stream 379 to the mixed stream 335). In some embodiments, if the second cooled exhaust stream 385 is above a desired temperature for venting to the atmosphere, the second cooled exhaust stream 385 may be further cooled via a downstream mixing module (not shown). For example, the downstream mixing module may be substantially similar in respects to the downstream mixing modules discussed above. In some embodiments, a blower may be shared between the first cooled exhaust stream 387 and the second cooled exhaust stream 385 (e.g., via a splitter valve). In some embodiments the blower 340 (e.g., via one or more splitter valves) may be used to provide air to the mixing module 330 as well as to downstream mixing modules associated with the first cooled exhaust stream 387 and the second cooled exhaust stream 385. In still other embodiments, one or more downstream mixing modules may have a dedicated blower associated therewith configured for the exclusive use of the particular downstream mixing module.

Various determinations, for example, of whether flows or temperatures satisfy thresholds, may be made by the controller 390, which may also control the settings or operations of various aspects of the system 300, such as the blower 340, the ignition module 360, various valves, or the like. The controller 390 may be configured substantially similarly to the controllers 190, 290 discussed above in many respects. For example, the controller 390 may be configured as a computer processor or other logic-based device that performs operations based on one or more sets of instructions (e.g., software). The instructions on which the controller 390 operates may be stored on a tangible and non-transitory (e.g., not a transient signal) computer readable storage medium, such as a memory 396. The memory 396 may include one or more computer hard drives, flash drives, RAM, ROM, EEPROM, and the like. Alternatively, one or more of the sets of instructions that direct operations of the controller 390 may be hard-wired into the logic of the controller 390, such as by being hard-wired logic formed in the hardware of the controller 390.

The controller 390 of the illustrated embodiment includes a detection module 392, a control module 394, and a memory module 396 associated therewith. The detection module 392 is configured to receive information from sensors or detectors associated with the system 300. The detection module 392 may also process the received information to determine one or more operating parameters of the system 300 (e.g., a temperature, pressure, amount of flow, equivalence ratio, or the like). The control module 394 is configured to receive information from the detection module 392 and to control operation of the system 300 responsive to the received information. For example, the control module 394 may be configured to open, close, or adjust one or more valve settings to adjust flow through the system 300.

It should be noted that the above embodiments are provided by way of example and not limitation, as various components of the above example embodiments may be combined, added, removed, or re-arranged to form additional embodiments. For example, various energy generation modules may be used alternatively or additionally to each other in some embodiments, while other embodiments may not include an energy generation module. As just one other example, in some embodiments, a pre-mixing heat exchanger may be present while a post-mixing heat exchanger is not.

Figure 4:
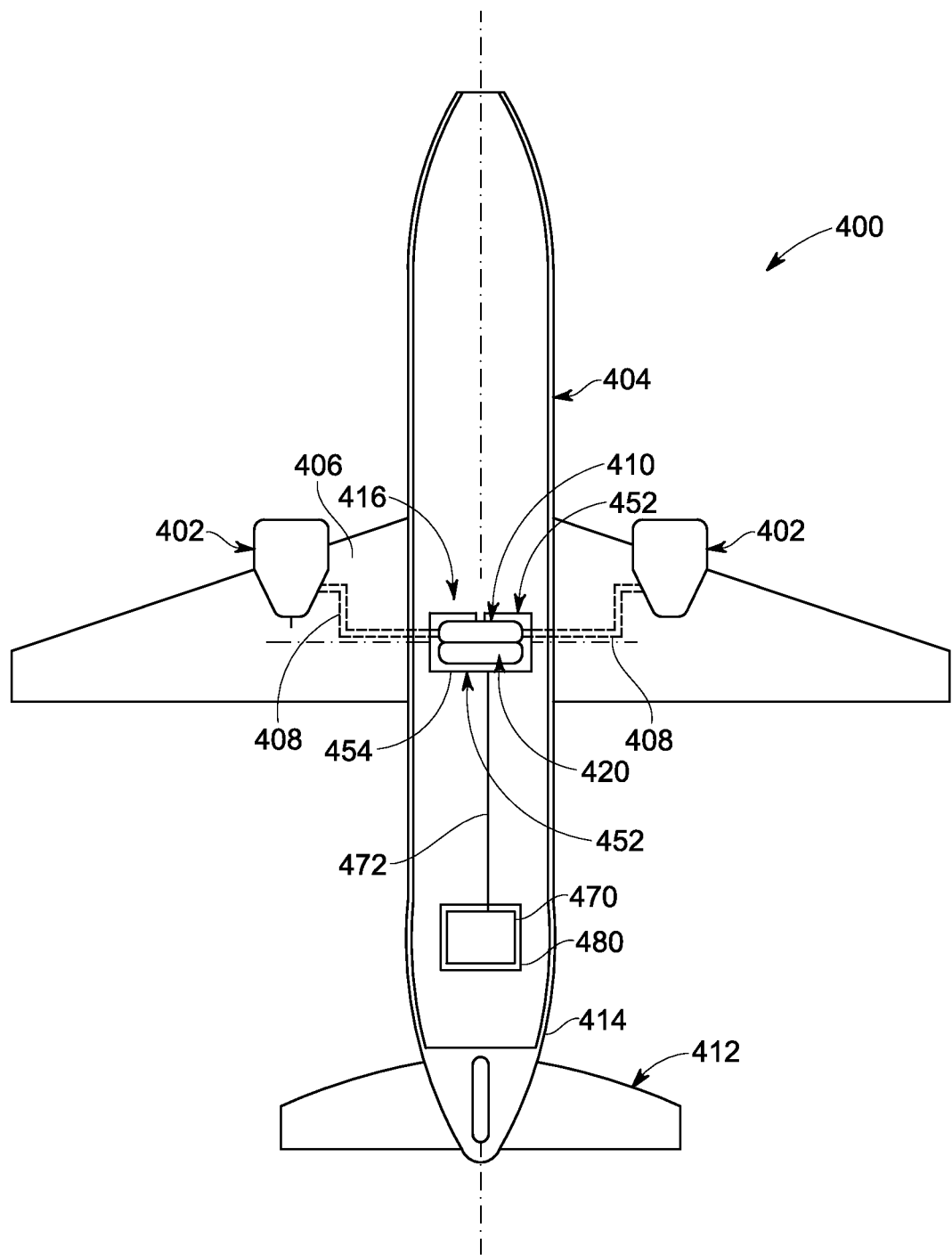
FIG. 4 is a schematic illustration of an embodiment of a system for oxidizing boil-off gas disposed within an aircraft in accordance with various embodiments.

As indicated above, a cryogenic tank may be located on-board an aircraft for containing fuel for an engine of the aircraft. For example, FIG. 4 is a schematic illustration of an exemplary embodiment of an aircraft 400 that includes one or more engines 402 that use a cryogenic fluid as fuel. In the exemplary embodiment of the aircraft 400, the cryogenic fluid used as fuel for the engine 402 and contained by the cryogenic tank 410 on-board the aircraft 400 is LNG. In various embodiments, the cryogenic fluid contained by the cryogenic tank 410 for use as fuel for the aircraft engine 402 may be any type of cryogenic fluid (which may be contained within the cryogenic tank 410 in liquid and/or gaseous form) that is suitable for use as fuel for the aircraft engine 402. In the exemplary embodiment of the aircraft 400, the aircraft 400 is a fixed wing airplane.

The aircraft 400 includes an airframe 404 and a system 406, which includes the engine 402 and the cryogenic tank 410. The engine system 406, including the cryogenic tank 410, is located on-board the airframe 404. Specifically, the engine 402, the cryogenic tank 410, and various other components of the engine system 406 are positioned at various locations on and/or within the airframe 404 such that the engine 402, the cryogenic tank 410, and the various other components of the engine system 406 are carried by the airframe 404 during flight of the aircraft 400. It may be noted that the various components of the engine system (e.g., the engine 402 and the cryogenic tank 410) need not necessarily be mounted together. Indeed some components of the engine system 406, such as the cryogenic tank 410, may be configured for removal and replacement from the aircraft 400.

The engines 402 of the illustrated embodiment are operatively connected in fluid communication to receive cryogenic fluid from the cryogenic tank 410, for example through fuel conduits 408. The engines 402 use the cryogenic fluid as fuel to generate thrust for generating and controlling flight of the aircraft 400. The engine system 406 may include one or more fuel pumps (not shown). Each fuel pump is operatively connected in fluid communication with the cryogenic tank 410 and with one or more corresponding engines 402 for pumping cryogenic fluid from the cryogenic tank 410 to the engine(s) 402. Fuel pumps may be disposed in various locations along the airframe 404, such as, but not limited to, within an internal volume 420 of the cryogenic tank 410, mounted to a corresponding engine 402, located proximate a corresponding engine 402, or the like.

In the exemplary embodiment of the aircraft 400 depicted in FIG. 4, the engines 402 are configured to use at least natural gas as fuel. In some other embodiments, the engines 402 are configured to use at least another cryogenic fluid as fuel. The cryogenic fluid pumped from the cryogenic tank 410 to the engines 402 may be supplied to the engines 402 in a gaseous form and/or as a liquid, no matter in which state(s) the cryogenic fluid is contained in the cryogenic tank 410. For example, in the exemplary embodiment of the aircraft 400, the engines 402 use the natural gas as fuel in the gaseous state. The engine system 406 may include one or more heating systems (not shown) that heat LNG stored by the cryogenic tank 410 to change the LNG stored by the cryogenic tank 410 to the gaseous state for supply to the engines 402 as fuel. In some other embodiments, one or more of the engines 402 is configured to use both natural gas and one or more other types of fuel, whether at the same and/or different times. It should be noted that the aircraft 400 may include a fuel tank (not shown) that holds a different type of fuel than natural gas.

Each engine 402 may be any type of engine, such as, but not limited to, a turbine engine, an engine that drives a propeller or other rotor, a radial engine, a piston engine, a turboprop engine, a turbofan engine, and/or the like. Although two engines are shown in the illustrated embodiments, the aircraft 400 may include any number of engines 402. Although shown located on wings 410 of the airframe 404 in FIG. 4, in various embodiments different mounting locations for each engine 402 along the airframe 404 may be employed. For example, the aircraft 400 may include an engine located at a tail 412 and/or another location along a fuselage 414 of the airframe 404.

The cryogenic tank 410 is supported on one or more support surfaces 452 of the aircraft 400. In the exemplary embodiment of the aircraft 400, the cryogenic tank 410 is supported on two pallets 454 that are loaded on-board the aircraft 400 and include the support surface 452. In other embodiments, the cryogenic tank 410 may be supported on a single pallet. The cryogenic tank 410 may be secured to the pallets 454 using any suitable attachment member, such as, but not limited to, straps, cables, chains, clamps, threaded fasteners, and/or the like. In some embodiments, the attachment member(s) used to secure the cryogenic tank 410 to the pallets 454 is selected such that the cryogenic tank 410 is configured to withstand up to or greater than an acceleration of approximately nine times gravitational acceleration without dislodging from the pallets 454. In some embodiments, the cryogenic tank 410 is connected directly to the fuselage 414 via support feet or the like.

A boil-off gas oxidation system 470 is also mounted to the aircraft 400 and operatively connected to the cryogenic tank 400. For example, the boil-off gas oxidation system 470 may be connected to the cryogenic tank 410 via a boil-off gas conduit 472. The boil-off gas conduit 472, for example, may include a length of piping and/or hose along with appropriate connection members. A control valve for controlling the flow of boil-off gas from the cryogenic tank 410 to the boil-off gas oxidation system 470 may be positioned along the boil-off gas conduit 472 or otherwise associated therewith. The boil-off gas oxidation system 470 may be generally configured similarly to the systems 100, 200, 300 discussed above. In some embodiments, the boil-off gas oxidation system 470 may be configured to internally provide all the energy required for the oxidation of boil-off gas from the cryogenic tank 410 without requiring power from the aircraft 400 or external source. For example, the boil-off gas oxidation system 470 may include one or more energy generation modules (such as the energy generation modules or turbines discussed above) and one or more energy storage modules (e.g., a battery) to produce and/or store the energy required to operate any components (e.g., blowers, ignition modules, associated control systems, or the like) required to operate the boil-off gas oxidation system.

In the illustrated embodiment, the boil-off gas oxidation system 470 is mounted on a pallet 480 that is removably mounted to the aircraft 400. Thus, the boil-off gas oxidation system may be readily loaded on or un-loaded off of the aircraft 400. The pallet 480 may be configured and mounted in a generally similar fashion as discussed above in connection with the pallets 454. In various embodiments, the boil-off gas system 470 may be mounted on the same pallet or pallets as the cryogenic tank 410 and configured to be loaded or un-loaded therewith as a single effective unit. In some embodiments, the boil-off gas oxidation system 470 may be a separately loadable unit mounted on a dedicated pallet (e.g., pallet 480) that is operatively connected to the cryogenic tank 410 after loading. In some embodiments, the boil-off gas oxidation system 470 may include a dedicated controller, while in other embodiments, a control module associated with additional operations of the aircraft 400 may be employed to control the operation of the boil-off gas oxidation system 470.

The cryogenic tank 410 and/or the boil-off gas oxidation system 470 may be located at any suitable location on and/or within the airframe 404. In the exemplary embodiment of the aircraft 400, the pallets 454 and the cryogenic tank 410 supported thereon as well as the pallet 480 and the boil-off gas oxidation system 470 supported thereon are located within a cargo hold 416 of the fuselage 414 of the airframe 404. In the illustrated embodiment, the cryogenic tank 410 and the boil-off gas oxidation system 470 are not integral to the airframe 404 of the aircraft 400. Instead, the cryogenic tank 410 and the boil-off gas oxidation system 470 are supported on the pallets configured to be loaded on-board the airframe 404, rather than being integral to the airframe 404. In alternate embodiments, the cryogenic tank 410 and/or one or more aspects of the boil-off gas oxidation system 470 may be permanently mounted or integral to the airframe 404.

Figure 5:
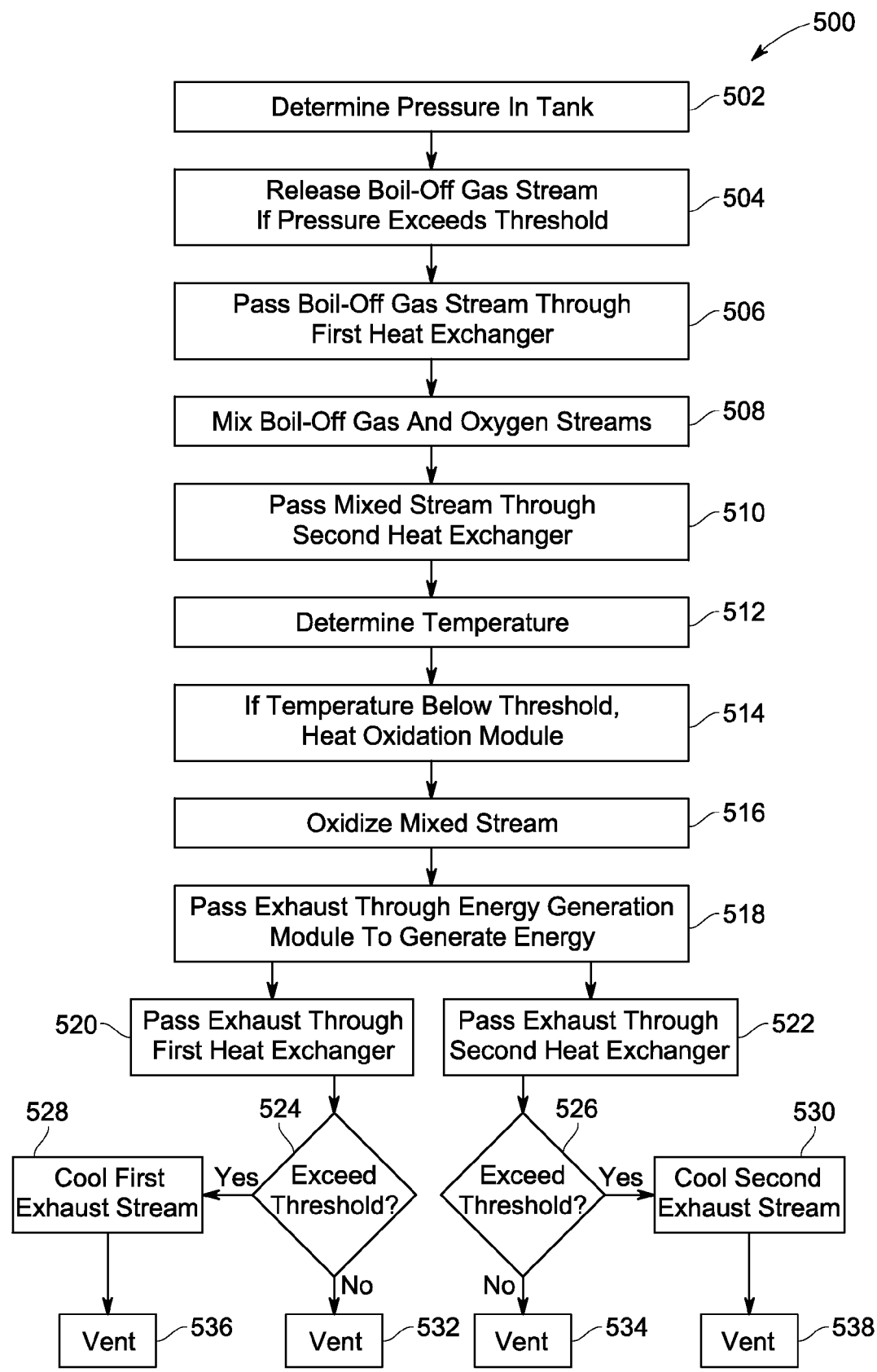
FIG. 5 is flowchart of a method for oxidizing boil-off gas from a cryotank in accordance with various embodiments.

FIG. 5 is a flow chart of a method 500 for oxidizing boil-off gas in accordance with an embodiment. The method 500, for example, may employ structures or aspects of various embodiments discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 502, a pressure of a cryotank (e.g., a tank configured to contain LNG for use on-board an aircraft) is determined. For example, the pressure within the cryotank may be elevated above a design pressure due to evaporation of the LNG as a boil-off gas. The pressure may be determined, for example, via a detector or sensor positioned proximate to the cryotank.

At 504, if the pressure of the cryotank exceeds a threshold pressure (e.g., about 1.5 atmospheres), boil-off gas from the cryotank may be released through a conduit (e.g., piping) in a downstream direction. For example, a controller receiving information regarding the pressure from the detector or sensor may operate a control valve to release the boil-off gas from the cryotank. The boil-off gas is directed via the conduit for further processing (e.g., oxidation) to reduce the risk of combustibility and/or to reduce a harmfulness of emissions.

At 506, the boil-off gas stream from the cryotank is passed through a first heat exchanger. The boil-off gas stream is heated through an exchange of heat with a stream of exhaust gas from an oxidation process. For example, the boil-off gas, which will be mixed with an oxygen stream (e.g., a stream of atmospheric air including oxygen) may be heated to a temperature at or near ambient temperature to reduce or minimize condensation. After being heated the boil-off gas stream is directed downstream to a mixing module.

At 508, the boil-off gas stream is mixed with an oxygen stream. For example, in some embodiments, the boil-off gas stream is mixed in a mixing module with atmospheric air (which contains oxygen) provided via a blower. In some embodiments, the boil-off gas stream may be mixed with atmospheric air by an ejector. The boil-off gas stream and the air stream are mixed in some embodiments to provide a desired equivalence ratio for facilitating the oxidation of the boil-off gas (or conversion of the boil-of gas and oxygen to carbon dioxide and water) at a low enough to temperature to reduce or eliminate the risk of ignition of the boil-off gas.

At 510, the mixed stream produced at 508 is directed downstream and passed through a second heat exchanger. The mixed stream is heated via heat exchange with an exhaust stream from an oxidation process, similar to the heating of the boil-off gas stream at 506.

At 512, the temperature of the heated mixed stream and/or of an oxidation module is determined. If the temperature is below a threshold temperature for satisfactory oxidation performance (e.g., satisfactory performance of a catalytic converter), an oxidation module (e.g., catalytic converter) is heated at 514, and the mixed stream is oxidized in the oxidation module 516. For example, an ignition module may heat the oxidation module. In various embodiments, electrical heat, inductive heat, a pilot light, a spark plug, or the like may be used to heat the oxidation module. If the temperature of the mixed stream and/or the oxidation module is determined sufficient at 512, the mixed stream may be passed to the oxidation module without heating the oxidation module. The oxidation module is configured to facilitate the conversion of the boil-off gas (e.g. LNG) and oxygen to inert products, such as carbon dioxide and water.

At 518, the exhaust stream from the oxidation module is passed further downstream to an energy generation module, which is configured to utilize the exhaust stream to produce an energy that may be used by one or more aspects of the system. For example, electrical energy used by an ignition module (e.g., via energy storage in a battery) and/or electrical energy to power a blower configured to provide an air stream to one or more mixing modules, may be produced by the energy generation module. In some embodiments, the energy generation module may include a thermoelectric generator. In other embodiments, for example, the energy generation module may include a turbine that utilizes the exhaust stream to rotate an output shaft used to power a blower for providing an air stream to one or more mixing modules.

At 520 and 522, the exhaust stream from the energy generation module (which is at an elevated temperature due to the oxidation process) may be passed through the first and second heat exchangers to heat the pre-mixed boil-off gas stream (see step 506) and the mixed stream (see step 510), respectively. A controller may be used to control the proportion of exhaust gas provided to each of the heat exchangers.

At 524 and 526, an exhaust temperature is determined for the first and second heat exchangers, respectively. If the exhaust temperature exceeds a threshold desired emission temperature, the exhaust temperature may be reduced via a downstream mixing module at 528, 530, respectively. If the exhaust temperature does not exceed the threshold temperature, the particular exhaust stream satisfying the threshold temperature may be vented directly to the atmosphere at 532, 534, respectively.

At 528 and 530, for any exhaust stream determined to exceed the threshold temperature, the particular exhaust stream is cooled. For example, the exhaust stream may be mixed with a cooling stream at a downstream mixing module. In some embodiments, the cooling stream is provided by a blower that is also used to provide an oxygen stream for the mixing discussed at 508. For example, the output of the blower may be fed to a splitter valve, where the output of the blower is split between a mixing module configured to mix oxygen with a boil-off gas stream and one or more downstream mixing modules configured to provide a cooling flow to an exhaust stream. The blower, for example, may be configured to receive power from the energy generation module discussed at 518. After cooling, the first and second cooled exhaust streams may be vented to the atmosphere at 536, 538, respectively.

Thus, various embodiments provide for reduced emission of combustible gases and/or otherwise potentially harmful emissions, while providing for relatively compact, lightweight oxidizing systems that are capable of providing all or a portion of the energy required for operation. Various embodiments utilize heat and/or other energy (e.g., mechanical energy used to turn a shaft) from an exhaust gas stream produced by an oxidizing system (e.g., a catalytic converter) for boil-off gas (e.g., boil-off gas from a cryotank). Various embodiments provide for a self-contained system that may be loaded on to or removed from a vehicle such as an aircraft for containing a cryogenic fuel (e.g., LNG) and oxidizing boil-off gas from the cryogenic fuel with requiring power from any system or structure external to the system.

Various embodiments of systems and methods are described and illustrated herein with respect to being used in conjunction with a fuel tank on-board an aircraft for containing LNG that is used as fuel for an engine of the aircraft. However, certain embodiments are not limited to being used with aircraft, and are not limited to containing LNG. For example, various embodiments of may be located on any other stationary and/or mobile platform, such as, but not limited to, trains, automobiles, watercraft (e.g., a ship, a boat, a maritime vessel, and/or the like), or the like.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer", "controller", and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A system, comprising:
a mixing module configured to receive and mix a boil-off gas stream comprising a boil-off gas from a cryotank disposed in an upstream direction from the mixing module and art oxygen stream to form a mixed stream;
an oxidation module disposed in a downstream direction of the mixing module and configured to receive the mixed stream, the oxidation module comprising a catalytic converter configured to oxidize the boil-off gas in the mixed stream to produce an exhaust stream that is output in the downstream direction; and
a heat exchanger comprising a first passage and a second passage and configured to exchange heat between streams passing through the first and second passages, the first passage configured to receive at least a portion of the exhaust stream, the second passage configured to receive a fluid including the boil-off gas, the second passage comprising an inlet and an outlet, the inlet and the outlet of the second passage disposed upstream of the oxidation module, whereby the heat exchanger is configured to heat the fluid including the boil-off gas and cool the at least a portion of the exhaust stream, whereby the fluid including, the boil-off gas is heated by the heat exchanger upstream of the oxidation module, wherein the inlet of the second passage of the heat exchanger is positioned downstream of the mixing module, the inlet configured to accept the mixed stream exiting the mixing module, whereby the mixed stream is heated after leaving the mixing module and before entering the oxidation module, further comprising a second heat exchanger comprising a first passage configured to accept a portion of the exhaust stream and a second passage configured to accept the boil-off as stream, the second passage of the second heat exchanger including an inlet interposed between the cryotank and the mixing module, whereby the boil-off gas is heated by the second heat exchanger before entering the mixing module.

2. The system of claim 1, wherein the inlet of the second passage of the heat exchanger is positioned upstream of the mixing module, the inlet configured to accept the boil-off has stream, whereby the boil-off gas is heated before entering the mixing module.

3. The system of claim 1, wherein the mixing module comprises an ejector configured to receive the boil-off gas stream at a pressure greater than atmospheric pressure, whereby the oxygen stream is entrained by the ejector from the atmosphere.

4. The system of claim 1, further comprising a thermoelectric power generation module disposed downstream of the catalytic converter, the thermoelectric power generation module configured to produce electrical energy using heat from the exhaust stream.

5. The system of claim 4, further comprising an ignition module configured to receive at least a portion of the electrical energy from the thermoelectric power generation module and to use the received electrical energy to heat the catalytic converter.

6. The system of claim 1, further comprising an ignition module configured to heat the catalytic converter.

7. The system of claim 1, further comprising a downstream mixing module disposed downstream of the oxidation module and configured to mix the exhaust stream with a cooling stream.

8. The system of claim 1, further comprising a blower configured to provide the oxygen stream to the mixing module.

9. The system of claim 8, further comprising an energy generation module disposed downstream of the oxidation module and configured to use the exhaust stream to provide energy for operating the blower.

10. The system of claim 8, further comprising a downstream mixing module disposed downstream of the oxidation module and configured to mix the exhaust stream with a cooling stream, wherein the blower is configured to provide the cooling stream to the downstream mixing module.

11. A system comprising:
a cryotank configured to contain a cryogenic fluid;
a control valve operably connected to the cryotank, the control valve configured to release a boil-off gas stream from the cryotank, the boil-off gas stream comprising a boil-off gas;
a mixing module disposed downstream of the cryotank and configured to receive and mix the boil-off gas stream and an oxygen stream to form a mixed stream;
a heat exchanger comprising a first passage and a second passage and configured to exchange heat between streams passing through the first and second passages the first passage configured to receive at least a portion of the exhaust stream, the second passage configured to receive a fluid including the boil-off gas, the second passage comprising an inlet and an outlet, the inlet and the outlet of the second passage disposed upstream of the oxidation module, whereby the heat exchanger is configured to heat the fluid including the boil-off gas and cool the at least a portion of the exhaust stream, whereby the fluid including the boil-off gas is heated by the heat exchanger upstream of the oxidation module, wherein the inlet of the second passage of the heat exchanger is positioned downstream of the mixing module, the inlet configured to accept the mixed stream exiting the mixing module, whereby the mixed stream is heated after leaving the mixing module and before entering the oxidation module, further comprising a second heat exchanger comprising a first passage configured to accept a portion of the exhaust stream and a second passage configured to accept the boil-off gas stream, the second passage of the second heat exchanger including an inlet interposed between the cryotank and the mixing module, whereby the boil-off gas is heated by the second heat exchanger before entering the mixing module;
an oxidation module disposed downstream of the mixing module and configured to receive the mixed stream, the oxidation module comprising a catalytic converter configured to oxidize the boil-off gas in the mixed stream to produce an exhaust stream that is output downstream from the oxidation module; and
an energy generation module disposed downstream of the oxidation module and configured to use the exhaust stream to provide energy for operating at least a portion of the system.

12. The system of claim 11, further comprising a blower configured to provide the oxygen stream to the mixing module, wherein the energy generation module comprises a turbine configured to provide mechanical energy for operating the blower.

13. The system of claim 11, wherein the energy generation module comprises a thermoelectric power generation module configured to produce electrical energy using heat from the exhaust stream.

14. The system of claim 13, further comprising an ignition module configured to receive at least a portion of the electrical energy from the thermoelectric power generation module and to use the received electrical energy to heat the catalytic converter.

15. The system of claim 13, further comprising a blower configured to provide the oxygen stream to the mixing module, wherein the blower is configured to receive at least a portion of the electrical energy from the thermoelectric power generation module.

16. The system of claim 11, further comprising a downstream mixing module disposed downstream of the oxidation module and configured to mix the exhaust stream with a cooling stream.

17. A tangible and non-transitory computer readable medium comprising one or more computer software modules configured to direct at least one processor to:
direct a boil-off gas stream comprising boil-off gas from a cryotank to a mixing module;
direct an oxygen stream to the mixing module;
mix the boil-off gas stream and the oxygen stream in the mixing module to produce a mixed stream;
direct the mixed stream through an oxidation module comprising a catalytic converter, whereby an exhaust stream is produced by the catalytic converter; and
direct the exhaust stream through at least one of:
a heat exchanger comprising a first passage and a second passage and configured to exchange heat between streams passing through the first and second passages, the first passage configured to receive the exhaust stream, the second passage configured to receive a fluid including the boil-off gas, the second passage comprising an inlet and an outlet, whereby the inlet and the outlet of the second passage are disposed upstream of the oxidation module, whereby the heat exchanger is configured to heat the fluid including, the boil-off gas and cool the exhaust stream, whereby the fluid including the boil-off gas is heated by the heat exchanger upstream of the oxidation module; or
an energy generation module disposed downstream of the oxidation module and configured to use the exhaust stream to provide energy for operating at least a portion of a system configured to process the boil-off gas stream), wherein the one or more software modules are further configured to direct the at least one processor to:
direct at least a portion of the exhaust stream through a first heat exchanger having an inlet configured to accept the boil-off gas stream and disposed upstream of the mixing module, whereby the boil-off gas is heated before entering the mixing module; and direct at least a portion of the exhaust stream through a second heat exchanger having an inlet configured to accept the mixed stream and disposed downstream of the mixing module, whereby the mixed stream is heated after leaving the mixing module and before entering the oxidation module.

18. The tangible and non-transitory computer readable medium of claim 17, wherein the one or more software modules are further configured to direct the at least one processor to determine if the temperature of the exhaust stream downstream of the at least one of the heat exchanger and the energy generation module exceeds a threshold exhaust temperature, and if the temperature of the exhaust stream exceeds a threshold temperature, to direct the exhaust stream through a downstream mixing module disposed downstream of the oxidation module and configured to mix the exhaust stream with a cooling stream.

19. The tangible and non-transitory computer readable medium of claim 17, wherein the one or more software modules are further configured to direct the at least one processor to direct energy generated by an energy generation module disposed downstream of the oxidation module to a blower configured to provide the oxygen stream to the mixing module.

* * * * *